United States Patent
Kitani et al.

(10) Patent No.: US 7,731,357 B2
(45) Date of Patent: Jun. 8, 2010

(54) METHOD FOR DESIGNING GROUP OF BI-ASPHERICAL TYPE PROGRESSIVE-POWER LENSES, AND GROUP OF BI-ASPHERICAL TYPE PROGRESSIVE-POWER LENSES

(75) Inventors: Akira Kitani, Tokyo (JP); Takashi Hatanaka, Tokyo (JP); Yoshihiro Kikuchi, Tokyo (JP)

(73) Assignee: Hoya Corporation, Tokyo (JP)

( * ) Notice: Subject to any disclaimer, the term of this patent is extended or adjusted under 35 U.S.C. 154(b) by 133 days.

(21) Appl. No.: 11/922,778

(22) PCT Filed: Jun. 22, 2006

(86) PCT No.: PCT/JP2006/312526

§ 371 (c)(1),
(2), (4) Date: Dec. 21, 2007

(87) PCT Pub. No.: WO2006/137489

PCT Pub. Date: Dec. 28, 2006

(65) Prior Publication Data

US 2009/0109396 A1    Apr. 30, 2009

(30) Foreign Application Priority Data

Jun. 24, 2005    (JP)    ............................. 2005-184407

(51) Int. Cl.
*G02C 7/06*    (2006.01)
(52) U.S. Cl. ........................................ 351/169; 351/159
(58) Field of Classification Search ................. 351/159, 351/160 R, 168–169
See application file for complete search history.

(56) References Cited

U.S. PATENT DOCUMENTS

| | | | |
|---|---|---|---|
| 6,935,744 B2 * | 8/2005 | Kitani et al. | ................. 351/169 |
| 7,048,376 B2 | 5/2006 | Shinohara et al. | |
| 2002/0176052 A1 | 11/2002 | Ueno | |

(Continued)

FOREIGN PATENT DOCUMENTS

CN    1506716 A    6/2004

(Continued)

*Primary Examiner*—Joseph Martinez
*Assistant Examiner*—James R Greece
(74) *Attorney, Agent, or Firm*—Oliff & Berridge, PLC

(57) ABSTRACT

There is provided a group of bi-aspherical type progressive-power lenses for which the processing costs are reduced. In a bi-aspherical type progressive-power lens(es), the relationships $DHf+DHn<DVf+DVn$ and $DHn<DVn$ or further, $DVn-DVf>ADD/2$ and $DHn-DHf<ADD/2$ are satisfied; $DHf$ and $DVf$ are designated respectively as a surface refractive power in a horizontal direction and a surface refractive power in a vertical direction at a far vision power measurement position F1 on a first refractive surface that acts as an object-side surface; with $DHn$ and $DVn$ are designated respectively as a surface refractive power in a horizontal direction and a surface refractive power in a vertical direction at a near vision power measurement position N1 on the first refractive surface; a surface astigmatism component at F1 and N1 of the first refractive surface is canceled by a second refractive surface of the eye-side surface; and the first and second refractive surfaces are combined to provide a far vision power (Df) and an addition (ADD) on the basis of a prescription; wherein the same first refractive surface is used for at least two or more kinds of different addition power.

5 Claims, 25 Drawing Sheets

U.S. PATENT DOCUMENTS

2004/0189932 A1 9/2004 Shinohara et al.
2004/0233385 A1* 11/2004 Kitani et al. ................ 351/168

FOREIGN PATENT DOCUMENTS

| EP | 1510852 A1 | 3/2005 |
|----|-----------|--------|
| JP | A 49-3595 | 1/1974 |
| JP | A-54-084750 | 7/1979 |
| JP | A 2000-249992 | 9/2000 |
| JP | A 2002-539499 | 11/2002 |
| JP | A 2003-500685 | 1/2003 |
| JP | A-2003-344813 | 12/2003 |
| JP | A 2003-344813 | 12/2003 |
| JP | A-2004-191757 | 7/2004 |
| JP | A 2004-524582 | 8/2004 |
| JP | A-2004-524582 | 8/2004 |
| RU | 2244951 C2 | 1/2005 |
| WO | WO 97/19383 A1 | 5/1997 |
| WO | WO 00/55678 A1 | 9/2000 |
| WO | WO 01/46744 A2 | 6/2001 |
| WO | WO 02/084382 A2 | 10/2002 |

* cited by examiner

FIG. 21

LIST OF REFRACTIVE POWERS OF EXAMPLES OF GROUPS OF BI-ASPHERICAL TYPE PROGRESSIVE-POWER LENSES AND ASSOCIATED DESIGN METHOD

| TABLE 1 | DVf1 | DHf1 | DVn1 | DHn1 | DVf2 | DHf2 | DVn2 | DHn2 | SPH | ADD |
|---|---|---|---|---|---|---|---|---|---|---|
| EXAMPLE 1-a | 5.00 | 5.00 | 8.00 | 5.00 | 5.00 | 5.00 | 7.00 | 4.00 | 0.00 | +1.00 |
| EXAMPLE 1-b | 5.00 | 5.00 | 8.00 | 5.00 | 5.00 | 5.00 | 6.00 | 3.00 | 0.00 | +2.00 |
| EXAMPLE 1-c | 5.00 | 5.00 | 8.00 | 5.00 | 5.00 | 5.00 | 5.00 | 2.00 | 0.00 | +3.00 |
| EXAMPLE 1-d | 5.00 | 5.00 | 8.00 | 5.00 | 5.00 | 5.00 | 4.50 | 1.50 | 0.00 | +3.50 |

| TABLE 2 | DVf1 | DHf1 | DVn1 | DHn1 | DVf2 | DHf2 | DVn2 | DHn2 | SPH | ADD |
|---|---|---|---|---|---|---|---|---|---|---|
| EXAMPLE 2-a | 5.00 | 5.00 | 8.00 | 5.00 | 6.00 | 6.00 | 8.00 | 5.00 | -1.00 | +1.00 |
| EXAMPLE 2-b | 5.00 | 5.00 | 8.00 | 5.00 | 6.00 | 6.00 | 7.00 | 4.00 | -1.00 | +2.00 |
| EXAMPLE 2-c | 5.00 | 5.00 | 8.00 | 5.00 | 6.00 | 6.00 | 6.00 | 3.00 | -1.00 | +3.00 |
| EXAMPLE 2-d | 5.00 | 5.00 | 8.00 | 5.00 | 6.00 | 6.00 | 5.50 | 2.50 | -1.00 | +3.50 |

| TABLE 3 | DVf1 | DHf1 | DVn1 | DHn1 | DVf2 | DHf2 | DVn2 | DHn2 | SPH | ADD |
|---|---|---|---|---|---|---|---|---|---|---|
| EXAMPLE 3-a | 5.00 | 5.00 | 8.00 | 5.00 | 4.00 | 4.00 | 6.00 | 3.00 | +1.00 | +1.00 |
| EXAMPLE 3-b | 5.00 | 5.00 | 8.00 | 5.00 | 4.00 | 4.00 | 5.00 | 2.00 | +1.00 | +2.00 |
| EXAMPLE 3-c | 5.00 | 5.00 | 8.00 | 5.00 | 4.00 | 4.00 | 4.00 | 1.00 | +1.00 | +3.00 |
| EXAMPLE 3-d | 5.00 | 5.00 | 8.00 | 5.00 | 4.00 | 4.00 | 3.50 | 0.50 | +1.00 | +3.50 |

| TABLE 4 | DVf1 | DHf1 | DVn1 | DHn1 | DVf2 | DHf2 | DVn2 | DHn2 | SPH | ADD |
|---|---|---|---|---|---|---|---|---|---|---|
| EXAMPLE 4-a | 5.00 | 5.00 | 8.00 | 6.00 | 3.00 | 3.00 | 5.00 | 3.00 | +2.00 | +1.00 |
| EXAMPLE 4-b | 5.00 | 5.00 | 8.00 | 6.00 | 3.00 | 3.00 | 4.00 | 2.00 | +2.00 | +2.00 |
| EXAMPLE 4-c | 5.00 | 5.00 | 8.00 | 6.00 | 3.00 | 3.00 | 3.00 | 1.00 | +2.00 | +3.00 |
| EXAMPLE 4-d | 5.00 | 5.00 | 8.00 | 6.00 | 3.00 | 3.00 | 2.50 | 0.50 | +2.00 | +3.50 |

FIG. 22

| TABLE 5 | DVf1 | DHf1 | DVn1 | DHn1 | DVf2 | DHf2 | DVn2 | DHn2 | SPH | ADD |
|---|---|---|---|---|---|---|---|---|---|---|
| CONVENTIONAL ART 5-a | 5.00 | 5.00 | 6.00 | 5.00 | 5.00 | 5.00 | 5.00 | 4.00 | 0.00 | +1.00 |
| CONVENTIONAL ART 5-b | 5.00 | 5.00 | 7.00 | 5.00 | 5.00 | 5.00 | 5.00 | 3.00 | 0.00 | +2.00 |
| CONVENTIONAL ART 5-c | 5.00 | 5.00 | 8.00 | 5.00 | 5.00 | 5.00 | 5.00 | 2.00 | 0.00 | +3.00 |
| CONVENTIONAL ART 5-d | 5.00 | 5.00 | 8.50 | 5.00 | 5.00 | 5.00 | 5.00 | 1.50 | 0.00 | +3.50 |

| TABLE 6 | DVf1 | DHf1 | DVn1 | DHn1 | DVf2 | DHf2 | DVn2 | DHn2 | SPH | ADD |
|---|---|---|---|---|---|---|---|---|---|---|
| CONVENTIONAL ART 6-a | 5.00 | 5.00 | 6.00 | 5.00 | 6.00 | 8.00 | 6.00 | 5.00 | -1.00 | +1.00 |
| CONVENTIONAL ART 6-b | 5.00 | 5.00 | 7.00 | 5.00 | 6.00 | 8.00 | 6.00 | 4.00 | -1.00 | +2.00 |
| CONVENTIONAL ART 6-c | 5.00 | 5.00 | 8.00 | 5.00 | 6.00 | 6.00 | 6.00 | 3.00 | -1.00 | +3.00 |
| CONVENTIONAL ART 6-d | 5.00 | 5.00 | 8.50 | 5.00 | 6.00 | 6.00 | 6.00 | 2.50 | -1.00 | +3.50 |

| TABLE 7 | DVf1 | DHf1 | DVn1 | DHn1 | DVf2 | DHf2 | DVn2 | DHn2 | SPH | ADD |
|---|---|---|---|---|---|---|---|---|---|---|
| CONVENTIONAL ART 7-a | 5.00 | 5.00 | 6.00 | 5.00 | 4.00 | 4.00 | 4.00 | 3.00 | +1.00 | +1.00 |
| CONVENTIONAL ART 7-b | 5.00 | 5.00 | 7.00 | 5.00 | 4.00 | 4.00 | 4.00 | 2.00 | +1.00 | +2.00 |
| CONVENTIONAL ART 7-c | 5.00 | 5.00 | 8.00 | 5.00 | 4.00 | 4.00 | 4.00 | 1.00 | +1.00 | +3.00 |
| CONVENTIONAL ART 7-d | 5.00 | 5.00 | 8.50 | 5.00 | 4.00 | 4.00 | 4.00 | 0.50 | +1.00 | +3.50 |

FOUR TYPES OF SEMI-LENS USED (TWELVE TYPES NECESSARY FOR ALL ADDITIONS) (0.75 THROUGH 3.50)

FIG. 23

EXAMPLES 1 THROUGH 3
(ONE TYPE OF SEMI-LENS FOR ALL ADDITIONS (0.75 THROUGH 3.50))

| SPH/ADD | ADD+0.75 | ADD+1.00 | ADD+1.25 | ADD+1.50 | ADD+1.75 | ADD+2.00 | ADD+2.25 | ADD+2.50 | ADD+2.75 | ADD+3.00 | ADD+3.25 | ADD+3.50 |
|---|---|---|---|---|---|---|---|---|---|---|---|---|
| +1.00 |  | 1-a |  |  |  | 1-b |  |  |  | 1-c |  | 1-d |
| +0.75 |  |  |  |  |  |  |  |  |  |  |  |  |
| +0.50 |  |  |  |  |  |  |  |  |  |  |  |  |
| +0.25 |  |  |  |  |  |  |  |  |  |  |  |  |
| +0.00 |  | 2-a |  |  |  | 2-b |  |  |  | 2-c |  | 2-d |
| -0.25 |  |  |  |  |  |  |  |  |  |  |  |  |
| -0.50 |  |  |  |  |  |  |  |  |  |  |  |  |
| -0.75 |  |  |  |  |  |  |  |  |  |  |  |  |
| -1.00 |  | 3-a |  |  |  | 3-b |  |  |  | 3-c |  | 3-d |

FIG. 24

CONVENTIONAL ART 5 THROUGH 7
(TWELVE TYPES OF SEMI-LENSES NECESSARY FOR ALL ADDITIONS (0.75 THROUGH 3.50))

| SPH / ADD | ADD+0.75 | ADD+1.00 | ADD+1.25 | ADD+1.50 | ADD+1.75 | ADD+2.00 | ADD+2.25 | ADD+2.50 | ADD+2.75 | ADD+3.00 | ADD+3.25 | ADD+3.50 |
|---|---|---|---|---|---|---|---|---|---|---|---|---|
| +1.00 | | 5-a | | | | 5-b | | | | 5-c | | 5-d |
| +0.75 | | | | | | | | | | | | |
| +0.50 | | | | | | | | | | | | |
| +0.25 | | | | | | | | | | | | |
| +0.00 | | 6-a | | | | 6-b | | | | 6-c | | 6-d |
| -0.25 | | | | | | | | | | | | |
| -0.50 | | | | | | | | | | | | |
| -0.75 | | | | | | | | | | | | |
| -1.00 | | 7-a | | | | 7-b | | | | 7-c | | 7-d |

METHOD FOR DESIGNING GROUP OF BI-ASPHERICAL TYPE PROGRESSIVE-POWER LENSES, AND GROUP OF BI-ASPHERICAL TYPE PROGRESSIVE-POWER LENSES

TECHNICAL FIELD

The present invention relates to a bi-aspherical type progressive-power lens, which is a lens used as, for example, a progressive-power lens for a spectacle for presbyopia that is configured to have a progressive refractive power action dividedly allotted to a first refractive surface being an object side surface and a second refractive surface being an eyeball side surface, so that the first surface and the second surface together provide a far vision power and an addition power based on prescription values.

BACKGROUND ART

Methods in recent years for designing bi-aspherical type progressive-power lens(es) are disclosed in Patent Documents 1 through 5, wherein the method of design involves dividing an element having progressive refractive power into a convex-surface side (object side) and a concave-surface side (eye side).

Patent Documents 2 through 5 in particular propose reducing astigmatism by combining a progressive-addition surface (a surface having progressive refractive power) and a regressive-addition surface (a surface having regressive refractive power).

Alternatively, the inventors of the present invention proposed bi-aspherical type progressive-power lens(es) as disclosed in Patent Document 6.

This lens involves a method for resolving the elements of a surface having progressive refractive power into curvature in the vertical direction and curvature in the horizontal direction, and combining the effects of the convex surface and the concave surface. The lens is configured so that the refractive surface elements of the prescription surface and the elements of the remaining object-side surface, which is different for each addition power, are disposed on the eye side.

The method for processing the refractive surface of a lens having progressive refractive power employs a method called the semi-finish lens method in order to reduce the overall processing cost and manufacture time. In this method, a halfway-processed lens blank (referred to hereinafter as a "semi-lens") is prepared. This blank is composed of a surface that has already been processed (molded) into the final shape on one side and an incompletely processed surface on the other side. A semi-lens having the optimal curve according to the design specifications is selected from a previously prepared group of semi-lenses based on the ordered prescription, and the incompletely processed surface is processed. Selecting the shape and the concavity or convexity of the incompletely processed surface is decided by the manufacturer at the design stage.

Since a lens having progressive refractive power is provided with an addition power according to the prescription, semi-lenses are prepared with curves designed in accordance with the established range of addition powers relative to a basic design curve (a base curve). With an established addition power range of 0.5 to 3.50 diopters, for example, semi-lenses with thirteen different types of design curves are prepared if classified into groups in increments of 0.25 diopter. (In the specification of the present invention, designs for lenses having progressive refractive power are regarded as a single overall technical concept, as above, and lenses with prescriptions ranging from far-sighted presbyopia to near-sighted presbyopia (including lenses wherein the diopter range for distance vision extends from positive to negative as well as 0.00 diopters) are referred to as "lenses having progressive refractive power.")

[Patent Document 1] Domestic re-publication of PCT international publication W097/19383

[Patent Document 2] Japanese Laid-open Patent Publication No. 2000-249992

[Patent Document 3] Published Japanese translation of PCT international publication No. 2002-539499

[Patent Document 4] Published Japanese translation of PCT international publication No. 2003-500685

[Patent Document 5] Published Japanese translation of PCT international publication No. 2004-524582

[Patent Document 6] Japanese Laid-open Patent Publication No. 2000-344813

DISCLOSURE OF THE INVENTION

Problems to be Solved by the Invention

Structuring the refractive surfaces is complex, establishing a common base curve is difficult, and using only conventional semi-lens methods necessitates the preparation of numerous designs for semi-lenses and involves problems in inventory management. This is because the addition power is distributed between both surfaces of the lens in the bi-aspherical type lenses described above for Patent Documents 1 through 5, which, despite having different design methodologies, are design types wherein elements having progressive refractive power are on both surfaces, as described above. Methods wherein both surfaces must be processed after each order is received are inefficient and therefore involve problems of cost. Patent Document 6 employs a method of optical design in which the elements of a surface having progressive refractive power are resolved into curvature in the vertical direction and curvature in the horizontal direction, and in which the effects of the convex surface and the concave surface are combined. While this method involves optical improvements, the method is problematic in that no effective proposal is made for measures to reduce processing costs.

It is an object of the present invention to provide a method for designing a group of bi-aspherical type progressive-power lenses, and to provide a group of bi-aspherical type progressive-power lenses that are suitable for a processing method for processing semi-lenses that have already been prepared before an order is received, particularly as regards the object-side surface.

Means Used to Solve the Above-Mentioned Problems

The method for designing a group of bi-aspherical type progressive-power lenses according to the present invention is provided, with each lens having a progressive refractive power action dividedly allotted to a first refractive surface being an object side surface and a second refractive surface being an eyeball side surface, in which lens, when a surface refractive power in a horizontal direction and a surface refractive power in a vertical direction, at a far vision power measurement position F1 on the first refractive surface are DHf and DVf respectively, and a surface refractive power in a horizontal direction and a surface refractive power in a vertical direction, at a near vision power measurement position N1 on the first refractive surface, are DHn and DVn respectively, a relational expression is expressed by DHf+DHn<DVf+DVn, and DHn<DVn, surface astigmatism components at F1 and N1 on the first refractive surface are canceled by the second refractive surface, and a combination of the first and second refractive surfaces gives a far vision power (Df) and an addition power (ADD) based on a prescription value, the method comprising: using the same first refractive surface for at least two or more lenses of different addition powers.

Furthermore, in the method for designing a group of bi-aspherical type progressive-power lenses according to the present invention, wherein each lens satisfies DVn−DVf>ADD/2 and DHn−DHf<ADD/2.

Moreover, in the method for designing a group of bi-aspherical type progressive-power lenses according to the present invention, the first refractive surface has lateral symmetry about the far vision power measurement position F1; and the second refractive surface has lateral asymmetry.

In addition, in the method for designing a group of bi-aspherical type progressive-power lenses according to the present invention, the first refractive surface is a surface of revolution that has as a generatrix a meridian that passes through the far vision power measurement position F1 and the near vision power measurement position N1; and the second refractive surface has lateral asymmetry.

Furthermore, in the group of bi-aspherical type progressive-power lenses according to the present invention, a group of lenses are designed by the aforementioned method for designing a group of bi-aspherical type progressive-power lenses.

Effect of the Invention

Since the same refractive surface can be established on the object-side surface for at least two or more kinds of addition powers in the method according to the invention of claims 1 through 2 for designing a group of bi-aspherical type progressive-power lenses, the same object-side surface can be used for specific distance-power ranges and addition power. Since a common semi-lens can be used for at least such power range, particularly when using a semi-lens with the object-side surface prepared beforehand, the efficiency of mass-production of semi-lenses can be improved, and bi-aspherical type progressive-power lenses of the prior invention can be obtained at a greatly reduced per-unit lens processing cost.

The convenience of processing can also be improved by establishing the same object-side surface.

When the relationship DVn−DVf>ADD is fulfilled, where the prescribed addition power is ADD and the surface refractive powers in the vertical direction at the far vision power measurement position F1 and the near vision power measurement position N1 on the object-side surface are DVf and DVn, respectively, the near portion of the bi-aspherical type progressive-power lenses of the present invention can be positioned closer to the eye than the near portion of conventional convex lenses having progressive refractive power, and a wider field of vision can be obtained at close range.

BEST MODE FOR CARRYING OUT THE INVENTION

Embodiments of the present invention will be explained below with reference to the drawings. A summary of a basic design will be described, but the method of design and the lens configuration that are used are disclosed in Patent Document 6, which was proposed by the inventors of the invention of the present application. Therefore, the basic configuration and design procedure are identical.

(Lens designing procedure]

(1) Both sides designing as a convex progressive-power lens At first, the lens is designed to be divided into a convex surface and a concave surface as a conventional convex progressive-power lens.

(1)-1: Designing the shape of the convex surface (convex progressive surface)

The shape of a conventional convex progressive surface is designed in accordance with input design parameters for the progressive surface in order to implement the addition power and the progressive zone length that are given as input data. The design in this step may employ various well-known conventional techniques.

A method wherein, first, a "principal meridian" is established along the "spine" constituting the lens surface is a specific example of such a method. The "principal meridian" should ultimately be a "principal line of fixation," which lies along the line of the intersection of the lens surface and the line of sight when a person wearing the spectacles looks straight ahead from the upper side (the distance portion) to the lower side (the near portion) with both eyes. Moving the inset of the near portion or otherwise modifying the portion in correspondence with the convergence effect of the eyes during near vision need not necessarily involve an arrangement in which the "principal line of fixation" is moved inward, as explained hereinafter. This "principal line of fixation" therefore passes through the center of the lens and is defined as the vertical meridian (principal meridian) that partitions the lens surface into left and right halves. The lens has two surfaces, front and back, and therefore there are two "principal meridians," front and back. The "principal meridian" is seen as a straight line when viewed from a direction perpendicular to the lens surface, but the "principal meridian" is generally a curve in three-dimensional space when the surface of the lens is curved.

A suitable distribution of refractive power is next established along the "principal meridian" based on the prescribed addition power, the progressive zone length, and other data. The distribution of refractive power can be established as being partitioned between the two front and back surfaces with consideration having been made for the effect of the thickness of the lens, the angle between the line of sight and the refractive surface, and other factors, but since this step involves designing the shape of a conventional convex progressive surface, the progressive effect is provided entirely on the first refractive surface; i.e., on the object-side surface. The resulting transmission refractive power D can therefore be generally approximated by D≈D1−D2, for example, where D1 is the surface refractive power of the front surface of the lens (the first refractive surface; i.e. the object-side surface), and D2 is the surface refractive power of the back surface of the lens (the second refractive surface; i.e., the eye-side surface). However, when combining D1 and D2, the object-side surface should be convex and the eye-side surface should be concave in the shape of a meniscus. Note that D2 is a positive value here. The back surface of the lens is usually concave and the surface refractive power usually has a negative value, but for the sake of simplification the value is made positive in the description of the present invention and the value is subtracted from D1 to calculate the transmission refractive power D.

The relationship between the surface refractive power and the shape of the surface is generally defined by the following equation:

$$Dn = (N-1)/R$$

Dn is the surface refractive power of a surface n (in units of diopters), N is the refractive index of the lens material, and R is the radius of curvature (in units of meters). A method of converting a distribution of surface refractive power into a distribution of curvature therefore uses a modified version of the above relationship:

$$1/R = Dn/(N-1)$$

The geometric shape of the "principal meridian line" is precisely determined by obtaining the distribution of curvature, and the "principal meridian line" corresponding to the spine for constituting a lens surface is established.

What is required next is a "a horizontal sectional curved line group" corresponding to a rib for constituting the lens surface. The angles of intersection between the "groups of horizontal cross-section curves" and the "principal meridian line" need not necessarily be right angles, but in this case each of the "groups of horizontal cross-section curves" will intersect the "principal meridian line" at a right angle for the sake of simplifying the description. The "surface refractive power in the horizontal direction" of the "groups of horizontal cross-section curves" at the points of intersection with the "principal meridian line" also do not necessarily need to be equivalent to the "surface refractive power in the vertical direction" along the "principal meridian line"; in fact, the invention of the present application is based on the surface refractive power being different in the vertical and horizontal directions, as described in the claims. Since this step involves designing the shape of a conventional convex progressive surface, however, the surface refractive power will be made equivalent in the vertical and horizontal directions at these intersection points.

The "horizontal cross-section curves" can be simple circular curves having surface refractive power at these intersection points, but a variety of techniques included in the prior art may be also be applied. The technique of JP-A 49-3595 is an example of a conventional technique related to the distribution of surface refractive power along the "horizontal cross-section curves." One substantially circular "horizontal cross-section curve" is established in proximity to the center of the lens. Cross-section curves that are positioned above the central cross-section curve have a distribution of surface refractive power that increases from the center to the sides, and cross-section curves that are positioned below the central cross-section curve have a distribution of surface refractive power that decreases from the center to the sides. The "principal meridian line" and the infinite "groups of horizontal cross-section curves" aligned thereon thus structure the lens surface in the manner of a "spine" and "ribs," defining the refractive surface.

(1)-2: The shape of the concave surface is designed in order to yield the far vision power given as input data for the design of the shape of the concave surface (spherical or astigmatic surface). If there is astigmatic power in the far vision power, an astigmatic surface is used; otherwise spherical surface is used. A center thickness CT suited to the optical power is designed at the same time as the mutual slope angles of the convex surface and the concave surface, defining the shape of the lens. A variety of well-known conventional techniques may be used in the design of this step, as well.

(2) The conventional convex progressive-power lens is converted into the shape of a lens of the invention of the present application in accordance with the far vision power, addition power (ADD), and other input data given for correcting the back surface that accompany conversion into the shape of a convex surface of bi-aspherical type progressive-power lens(es).

(2)-1: The conventional convex progressive surface is converted to the shape of a convex surface of the invention of the present application in accordance with the far vision power, addition, and other input data given for designing the shape of the concave surface (the bi-aspherical type progressive-power lens(es)). Specifically, the surface (the first refractive surface; i.e., the object-side surface) of the aforedescribed conventional convex progressive lens is made into a surface having progressive refractive power that satisfies the following relationships:

$$DHf + DHn < DVf + DVn \text{ and } DHn < DVn$$

or, $$DVn - DVf > ADD/2 \text{ and } DHn - DHf < ADD/2$$

wherein DHf is the surface refractive power in the horizontal direction at a far vision power measurement position F1, DVf is the surface refractive power in the vertical direction at the far vision power measurement position F1, DHn is the surface refractive power in the horizontal direction at a near vision power measurement position N1, and DVn is the surface refractive power in the vertical direction at the near vision power measurement position N1.

(2)-2: Designing the shape of the concave surface (bi-aspherical type progressive-power lens(es))

In (2)-1 above, the amount of deformation when converting from the conventional convex progressive surface to the shape of a convex surface of the invention of the present application is added to the shape of the convex surface shape designed in (1)-2. Specifically, only the same amount of deformation as the amount of deformation added to the front surface of the lens (the first refractive surface; i.e., the object-side surface) in the process of (2)-1 is also added to the back surface of the lens (the second refractive surface; i.e., the eye-side surface). This deformation resembles a bending of the lens, but the deformation is not uniform across the entire surface, and the surface should satisfy the relationships described in (2)-1.

(3) In order to realize an optical function imposed as the backside correction input data for designs such as transmission design, design based on a Listing's Law, and design for inset of the near portion, in a state that a spectacle wearer actually wears the spectacle, (2) it is preferable to add backside correction to the lens of the present invention obtained in (2). (3)-1 Concave surface shape design for optical transmission design (the bi-aspherical type progressive-power lens(es)) The optical transmission design is a method for obtaining an original optical function in the state that a spectacle wearer actually wears the spectacle. This design method is mainly a method for adding a "correcting action" to remove or reduce change in optical power and generation of astigmatism mainly caused by the sight of line and the lens surface which are not orthogonal to each other.

Specifically, as described above, a difference from a target original optical performance is grasped by a light-ray tracking calculation according to a direction of the sight of line, and a surface correction for canceling such a difference is executed. By repeating this process, the difference is minimized and an optimal solution can be obtained.

(3)-2 Concave surface shape (the bi-aspherical type progressive-power lens(es)) in accordance with Listing's Law It is well-known that the three-dimensional rotational movement of our eyes when surveying our surroundings conforms to a rule called "Listing's Law," but when the prescription power includes astigmatic power, the two axes of astigmatism may not align when viewing the surroundings even when the "astigmatism axis of the eye when viewing straight ahead" is matched with the astigmatism axis of the spectacle lens. Correcting action" for removing or reducing generation of astigmatism or change of power caused by unmatched astigmatic axis direction of the lens and the astigmatic axis direction of the eye in a peripheral view, can be added to the curved surface on the side having an astigmatism correcting action of the lens.

(3)-3 Concave surface shape for responding to an inset design of the near portion (the bi-aspherical type progressive-power lens(es)) After the input of the pupillary distance, the distance of the principal objects of near vision, and other information pertaining to the wearer, the near portion can be inset in accordance with the wearer data by designing the eye-side surface to achieve a curved surface with lateral asymmetry.

A basic design was described above.

Example designs will next be described employing a first refractive surface that is the same for two or more kinds of addition powers in bi-aspherical type progressive-power lenses that provide a far vision power (Df) and an addition power (ADD) on the basis of a prescription that combines the first and the second refractive surfaces. The lenses satisfy the following relationships:

DHf+DHn<DVf+DVn and DHn<DVn

DHf and DVf are designated as the surface refractive power in the horizontal direction and the surface refractive power in the vertical direction, respectively, at a far vision power measurement position F1 on the first refractive surface; and DHn and DVn are designated as the surface refractive power in the horizontal direction and the surface refractive power in the vertical direction, respectively, at a near vision power measurement position N1 on the first refractive surface, wherein the surface astigmatism component at F1 and N1 of the first refractive surface of the lenses is canceled by the second refractive surface, and the first and second refractive surfaces are combined to provide the far vision power (Df) and the addition power (ADD) based on a prescription value.

EXAMPLE 1

FIG. 21 is a diagram that shows a list of the surface refractive powers as well as the far vision powers and addition powers for Examples 1 through 4 (described hereinafter) in Tables 1 through 4, respectively. Tables 1 through 4 in FIG. 21 correspond to Examples 1 through 4 described hereinafter and are lists of the surface refractive powers, far vision powers, and addition powers. The meaning of the items appearing in Tables 1 through 4 is as below:

DVf1: Surface refractive power in the vertical direction at a far vision power measurement position F1 on the object-side surface DHf1: Surface refractive power in the horizontal direction at a far vision power measurement position F1 on the object-side surface DVn1: Surface refractive power in the vertical direction at a near vision power measurement position N1 on the object-side surface DHn1: Surface refractive power in the horizontal direction at a near vision power measurement position N1 on the object-side surface DVf2: Surface refractive power in the vertical direction at a far vision power measurement position F2 on the eye-side surface DHf2: Surface refractive power in the horizontal direction at the far vision power measurement position F2 on the eye-side surface DVn2: Surface refractive power in the vertical direction at a near vision power measurement position N2 on the eye-side surface DHn2: Surface refractive power in the horizontal direction at the near vision power measurement position N2 on the eye-side surface SPH: Far vision power. In order to simplify the description, however, an approximate value was attained using the following rough calculation:

(DVf1+DHf1)/2−(DVf2+DHf2)/2

ADD: Addition power. In order to simplify the description, however, an approximate value was attained using the following rough calculation:

(DVn1+DHn1)/2−(DVn2+DHn2)/2−SPH

FIGS. 5 through 20 each correspond to the aforedescribed Examples 1 through 4, and are graphs that show the distribution of surface refractive power along the principal sight line in Examples 1 through 4. The right side of the horizontal axis in FIGS. 5 through 20 shows an upper part of the lens, the left side shows a lower part of the lens, and the vertical axis shows surface refractive power. Graphs (1 through 4)-(a, b, c, d)-1 correspond to the object-side surface, and Graphs (1 through 4)-(a, b, c, d)-2 correspond to the eyeball-side surface. The solid lines in the graphs indicate the distribution of surface refractive power in the vertical direction along the principal line of fixation, and the dotted lines in the graphs indicate the distribution of surface refractive power in the horizontal direction along the principal line of fixation. The graphs indicate basic differences in the surface configurations. Making the surfaces aspheric in order to remove peripheral astigmatism, adding an astigmatism component to correspond with astigmatic power, and other modifications have been omitted.

The meanings of the terminology used in the graphs of FIGS. 5 through 20 are as follows:

F1: The far vision power measurement position on the object side surface;

F2: the far vision power measurement position on the eyeball side surface;

N1: the near vision power measurement position on the object side surface;

N2: the near vision power measurement position on the eyeball side surface;

CV1: a graph (shown by a solid line) indicating the distribution of surface refractive power in the vertical direction along the principal line of fixation on the object-side surface CH1: a graph (shown by a dotted line) indicating the distribution of surface refractive power in the horizontal direction along the principal line of fixation on the object-side surface CV2: a graph (shown by a solid line) indicating the distribution of surface refractive power in the vertical direction along the principal line of fixation on the eyeball-side surface CH2: a graph (shown by a dotted line) indicating the distribution of surface refractive power in the horizontal direction along the principal line of fixation on the eyeball-side surface The surface refractive powers at F1, N1, F2, N2 in the graphs correspond to the aforementioned Tables 1 through 4, and the meaning of the terminology of DVf1 through DHn2 and the like is the same as in the Tables 1 through 4.

(Example 1-a, Example 1-b, Example 1-c, Example 1-d]

Table 1 and FIGS. 5 through 8 correspond to Example 1-a, Example 1-b, Example 1-c, and Example 1-d, respectively. These examples provide different addition powers using the same object-side surface, as can be understood from the fact that even though the values for DVf1, DHf1, DVn1, and DHn1 are each the same in Table 1, the ADD values are different. The same applies for FIGS. 5 through 8. The surface astigmatism at N1 is completely canceled by the surface astigmatism at N2. Near vision powers of N1 and N2, being a mean refractive power difference between N1 and N2 are different, thus giving different addition powers respectively such as +1.00, +2.00, +3.00, +3,50, while far vision powers of F1 and F2, being a mean refractive power difference between F1 and F2 are all 0.00.

(Example 2-a, Example 2-b, Example 2-c, Example 2-d]

Table 2 and FIGS. 9 through 12 correspond to Example 2-a, Example 2-b, Example 2-c, and Example 2-d, respectively. These examples provide different addition powers using the same object-side surface, as can be understood from the fact that even though the values for DVf1, DHf1, DVn1, and DHn1 are each the same in Table 2, the ADD values are different. The same applies for FIGS. 9 through 12. The surface astigmatism at N1 is completely canceled by the surface astigmatism at N2. Also, while the far vision powers, being the mean refractive power difference between F1 and F2 are all −1.00, the near vision powers, being the mean refractive difference between N1 and N2 are different, thus giving different addition powers such as +1.00, +2.00, +3.00, and +3.50, respectively.

(Example 3-a, Example 3-b, Example 3-c, Example 3-d]

Table 3 and FIGS. 13 through 16 correspond to Example 3-a, Example 3-b, Example 3-c, and Example 3-d, respectively. These examples provide different addition powers using the same object-side surface, as can be understood from the fact that even though the values for DVf1, DHf1, DVn1, and DHn1 are each the same in Table 3, the ADD values are different. The same applies for FIGS. 13 through 16. The surface astigmatism at N1 is completely canceled by the surface astigmatism at N2. Also, while the far vision powers, being the mean refractive power difference between F1 and F2 are all +1.00, the near vision powers, being the mean refractive difference between N1 and N2 are different, thus giving different addition powers such as +1.00, +2.00, +3.00, and +3.50, respectively.

(Example 4-a, Example 4-b, Example 4-c, Example 4-d]

Table 4 and FIGS. 17 through 20 correspond to Example 4-a, Example 4-b, Example 4-c, and Example 4-d, respectively. These examples provide different addition powers using the same object-side surface, as can be understood from the fact that even though the values for DVf1, DHf1, DVn1, and DHn1 are each the same in Table 4, the ADD values are different. The same applies for FIGS. 17 through 20. The surface astigmatism at N1 is completely canceled by the surface astigmatism at N2. Also, while the far vision powers, being the mean refractive power difference between F1 and F2 are all +2.00, the near vision powers, being the mean refractive difference between N1 and N2 are different, thus giving different addition powers such as +1.00, +2.00, +3.00, and +3.50, respectively.

Among these examples, Examples 1 through 3 use the same object-side surface, as can be understood from looking at Tables 1 through 3. Specifically, the fact that the same object-side surface is used for a range of far vision powers (−1.00 to +1.00) and addition powers (+1.00 to +3.50) can be seen in these examples. A common semi-lens can therefore be used for at least these power ranges, particularly when using semi-lenses whose object-side surfaces have been prepared beforehand.

The object-side surfaces of Examples 1 through 3 were not used in Example 4. This was so in order to prevent, in particular, a negative value being obtained for DHn2 during processing to a far vision power of +2.00 and an addition power of 3.50. Specifically, a negative value for DHn2 can be prevented by establishing DHn1 steeply within the range of the present invention. The same object-side surface is used for different addition powers (+1.00 to +3.50) even in Example 4, in which such a strategy is employed.

FIG. 22 is a diagram that shows a list of surface refractive powers as well as far vision powers and addition powers according to classifications of semi-lenses of the conventional art. FIG. 23 is a diagram that shows a table of semi-lenses classified according to the design method of groups of bi-aspherical type progressive-power lenses of Examples 1 through 3. FIG. 24 is a diagram that shows a table of semi-lenses classified according to the design method of a group of the bi-aspherical type progressive-power lenses of the conventional art of Tables 5 through 7 shown in FIG. 22. In FIGS. 23 and 24, the numerical values on the left side designate far vision spherical power and the numerical values at an upper stage designate the addition power. Astigmatic power has been omitted in order to simplify the description, but a pre-scribed range of astigmatic power may be included. FIG. 23 corresponds to Examples 1 through 3 of the present invention in Tables 1 through 3, and FIG. 24 corresponds to the conventional art in Tables 5 through 7. The indicated locations of 1-a, 7-c, and the like recorded in each diagram correspond to the optical powers (far vision spherical power and addition power) of numbers of the example of each table and a conventional art. just one type of semi-lens covers the entire optical-power range. On the other hand, the shapes of the convex surfaces are different for each addition power in FIG. 24, and twelve types of semi-lenses, from 0.75 to 3.50, must be used in order to cover the entire optical-power range of FIG. 24. In other words, a specialized semi-lens is necessary for each addition power in the design methods of the conventional art, but the same semi-lens can be used for different addition powers in the design method of the present invention. The present invention therefore only requires 1/12 as many types of semi-lenses as the conventional art for at least this power range, and only a very small manufacturing cost is necessary.

INDUSTRIAL APPLICATION

The present invention can be used as a spectacle lens for lenses in spectacles and the like having progressive refractive power.

BRIEF DESCRIPTION OF THE DRAWINGS

FIG. 3-2 is a descriptive diagram of the optical layout of a progressive addition lens and is a side view that shows a vertical cross-section;

FIG. 3-3 is a descriptive diagram of the optical layout of a progressive addition lens and is an elevation that shows a horizontal cross-section;

FIG. 21 is a diagram that shows a table of the refractive powers for the lenses of Examples 1 through 3;

FIG. 22 is a diagram that shows a table of refractive powers for lenses based on a conventional semi-lens classification chart;

FIG. 23 is a diagram that shows a semi-lens classification chart for the optical power ranges of Examples 1 through 3 of the present invention given in Tables 1 through 3; and FIG. 24 is a diagram that shows a semi-lens classification chart for the optical power ranges of Conventional Art 5 through 7 given in Tables 5 through 7.

Figure 1:
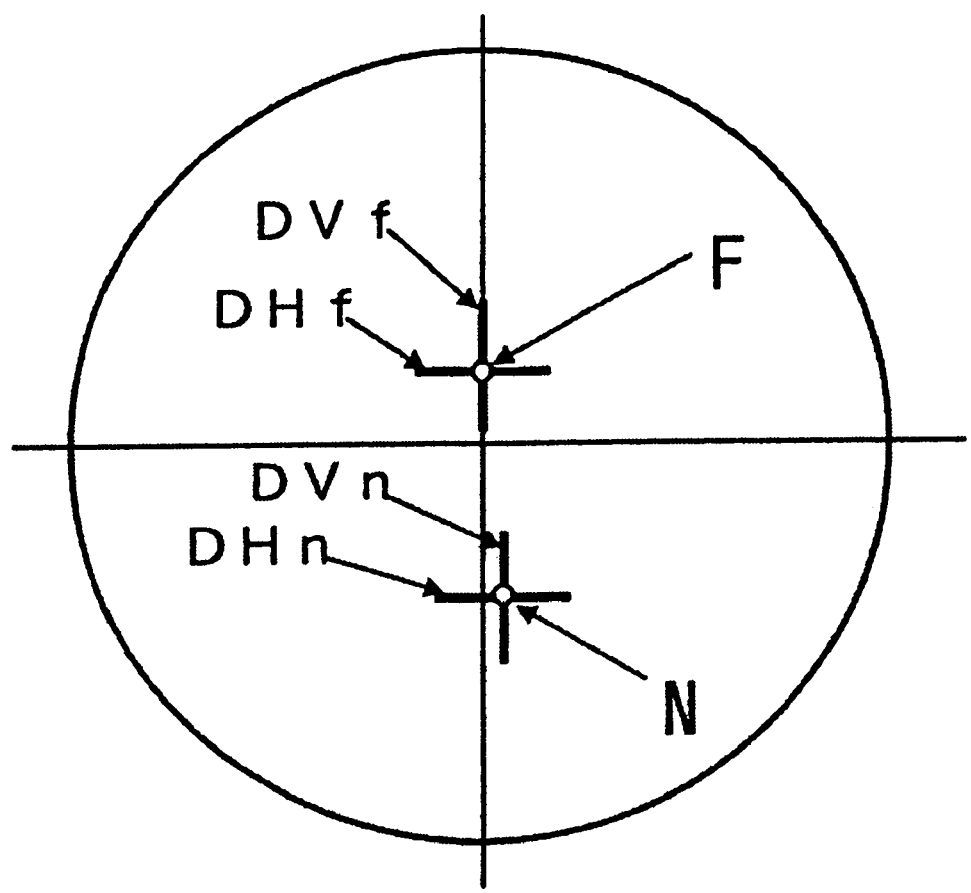
FIG. 1 is a descriptive diagram of a variety of surface refractive powers at various positions on the surface of a spectacle lens.
Figure 2:
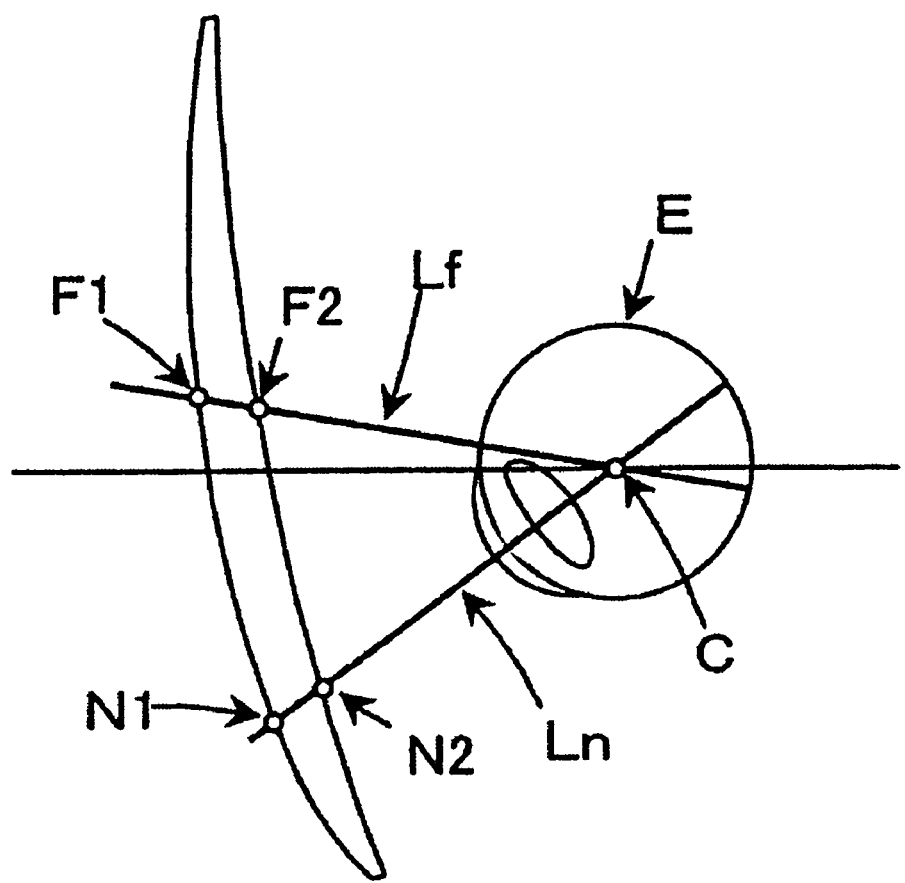
FIG. 2 is a descriptive diagram of the positional relationships between the eye, the line of sight, and the lens.
Figures 1, 3:
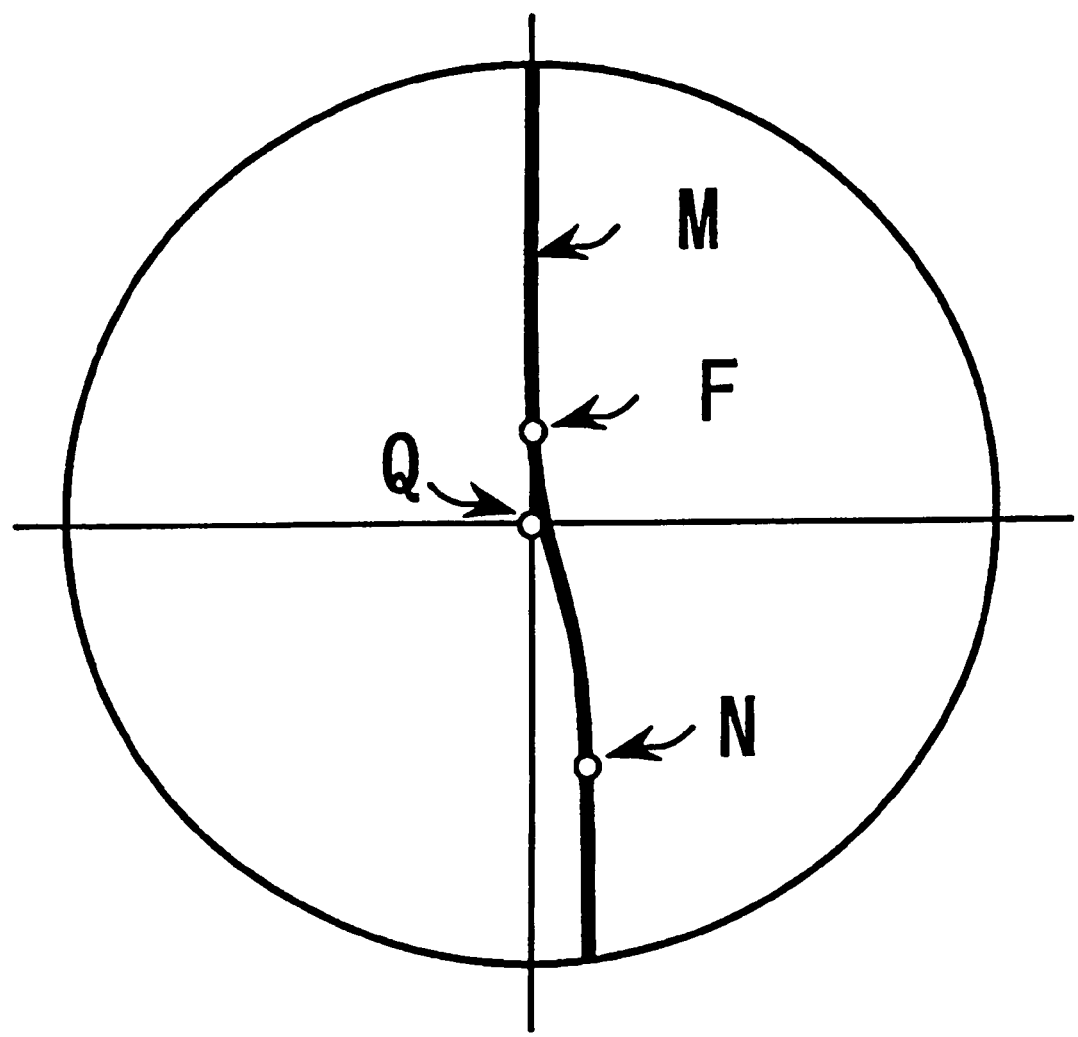
FIG. 3-$i$ is a descriptive diagram of the optical layout of a progressive addition lens and is a front view of the progressive addition lens from the object-side surface.
Figures 2, 3:
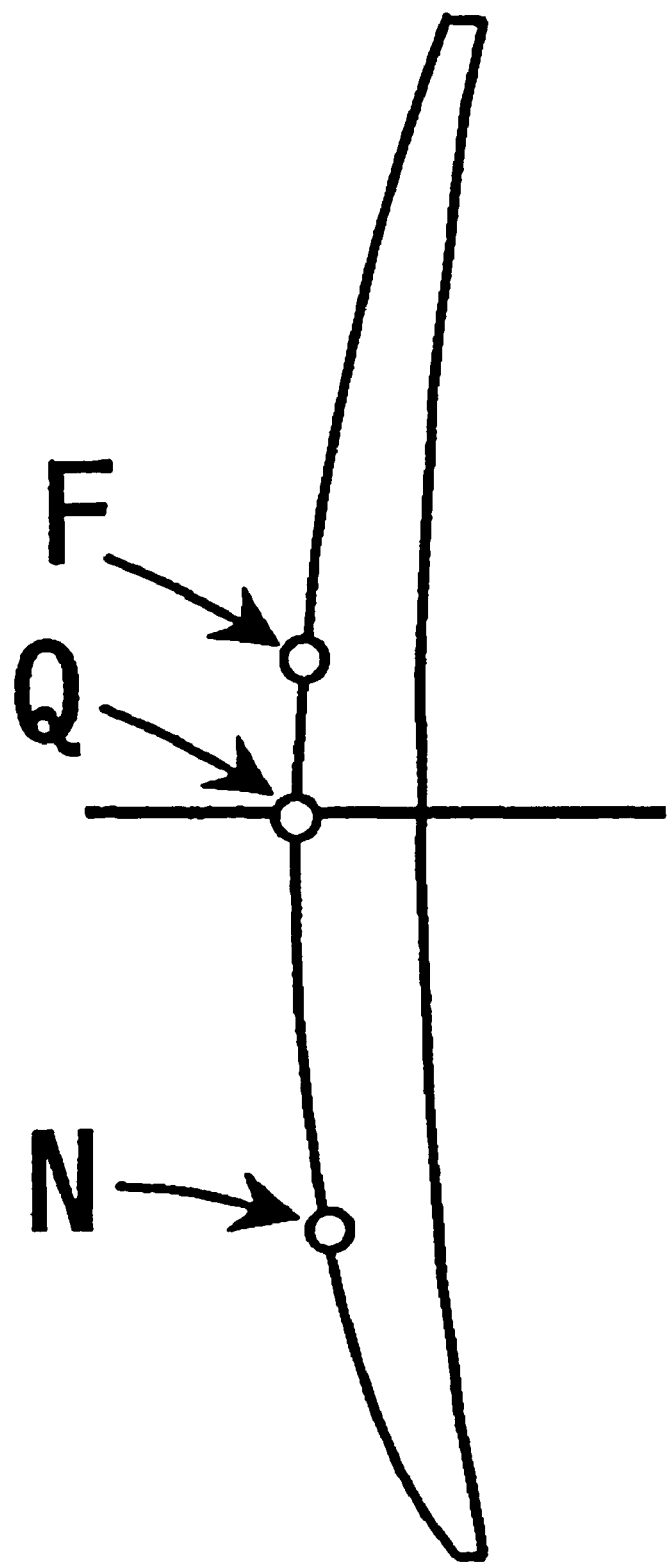
Figure 3:
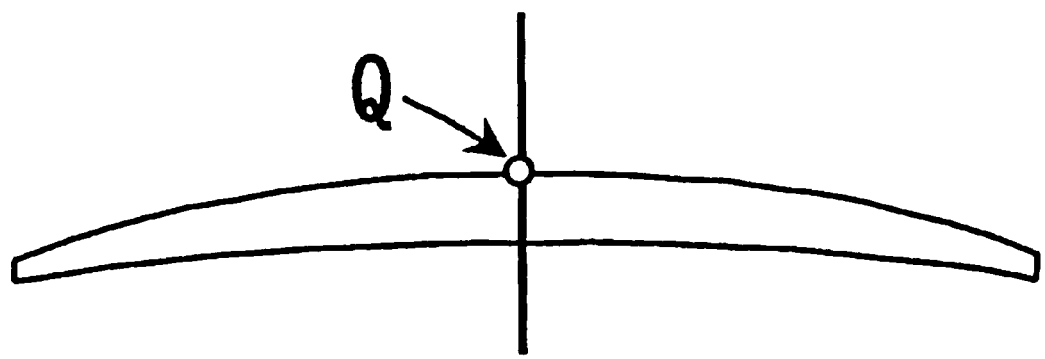
Figure 4:
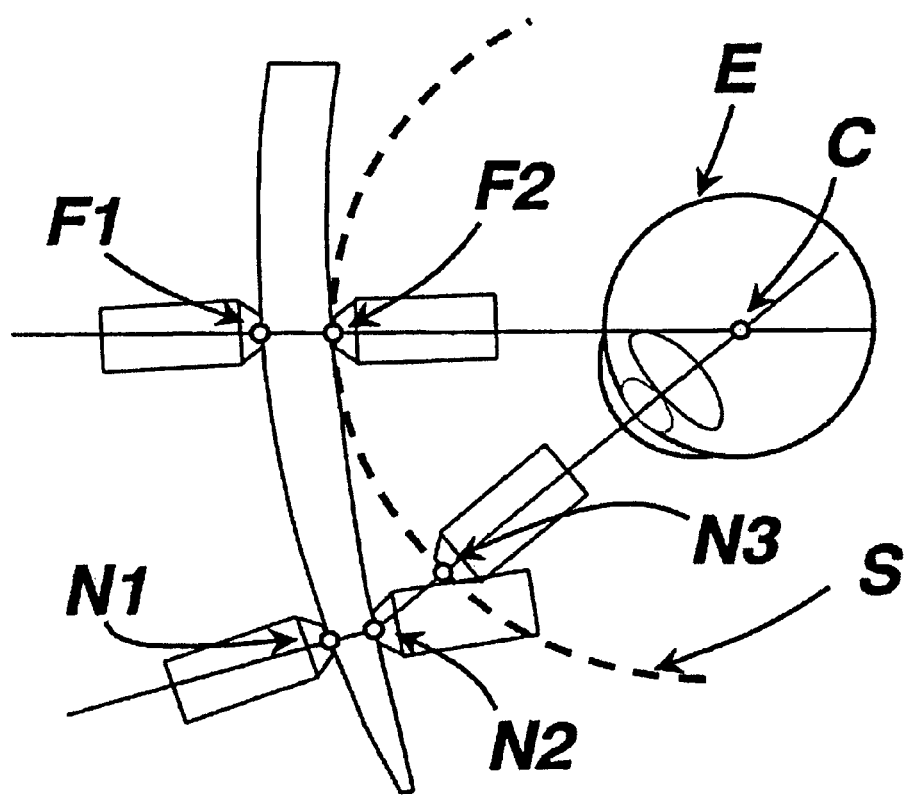
FIG. 4 is a descriptive diagram that shows differences between definitions of "addition power"
Figure 5:
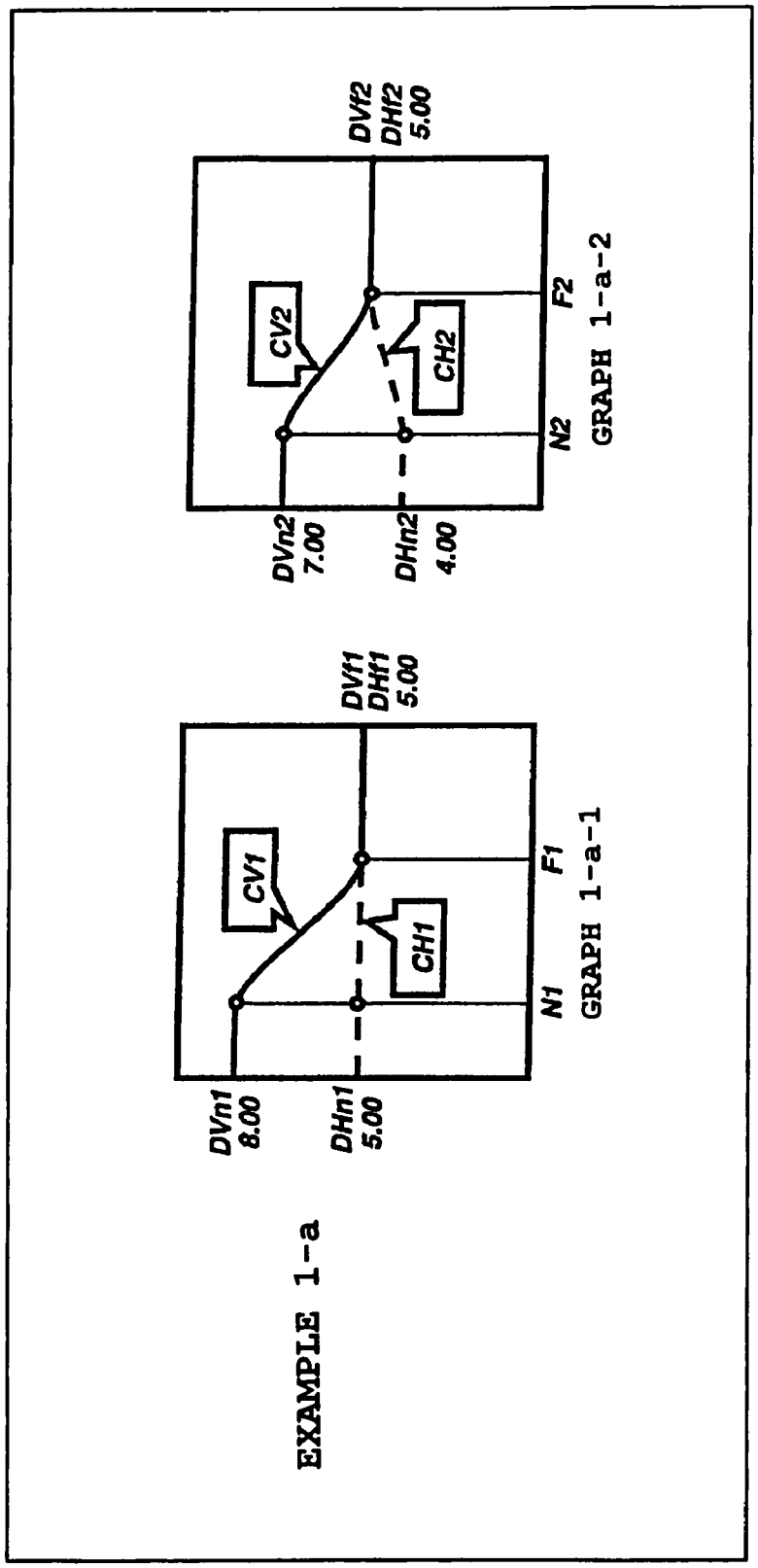
FIG. 5 is a diagram that shows Graphs 1-a-1 and 1-a-2, which show distributions of surface refractive power of an Example 1-a.
Figure 6:
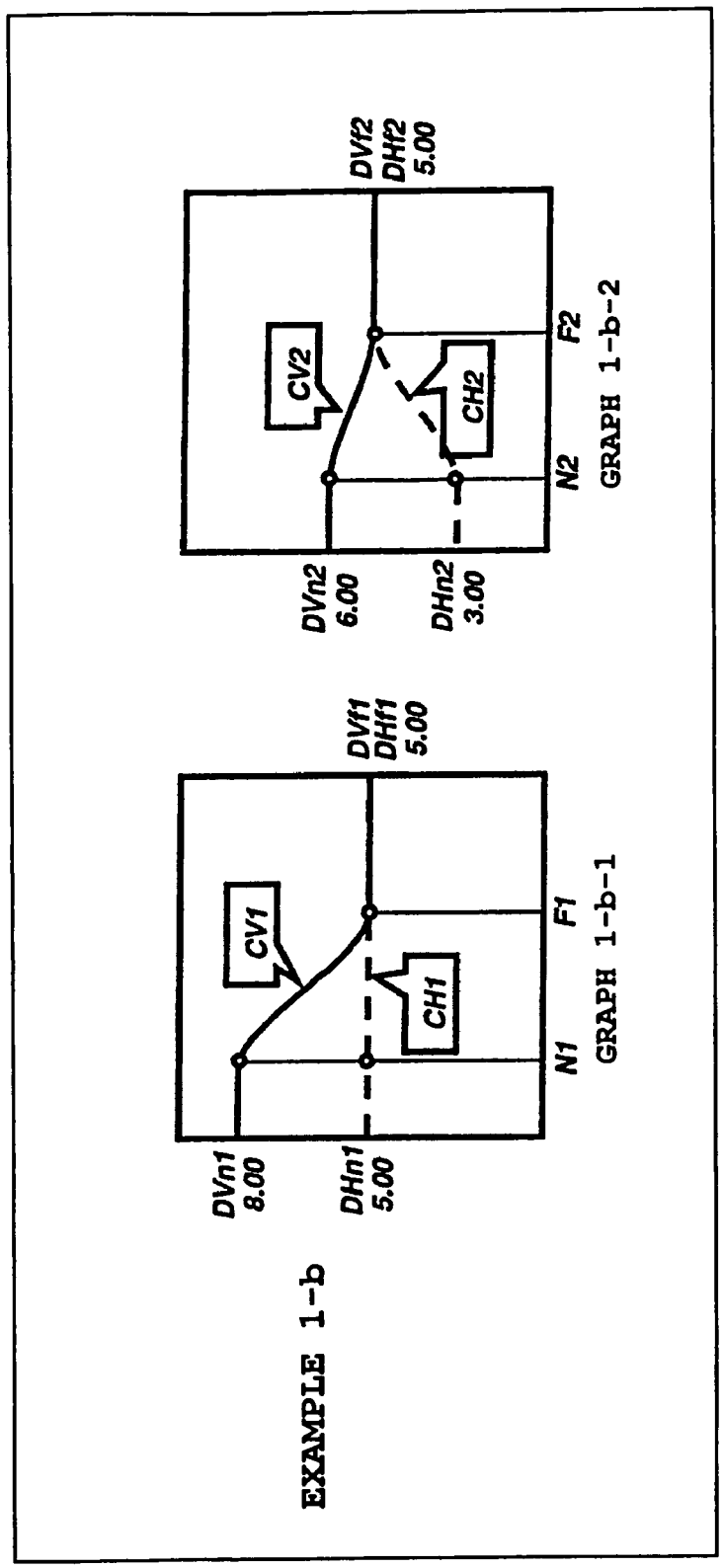
FIG. 6 is a diagram that shows Graphs 1-b-1 and i-b-2, which show distributions of surface refractive power of an Example 1-b.
Figure 7:
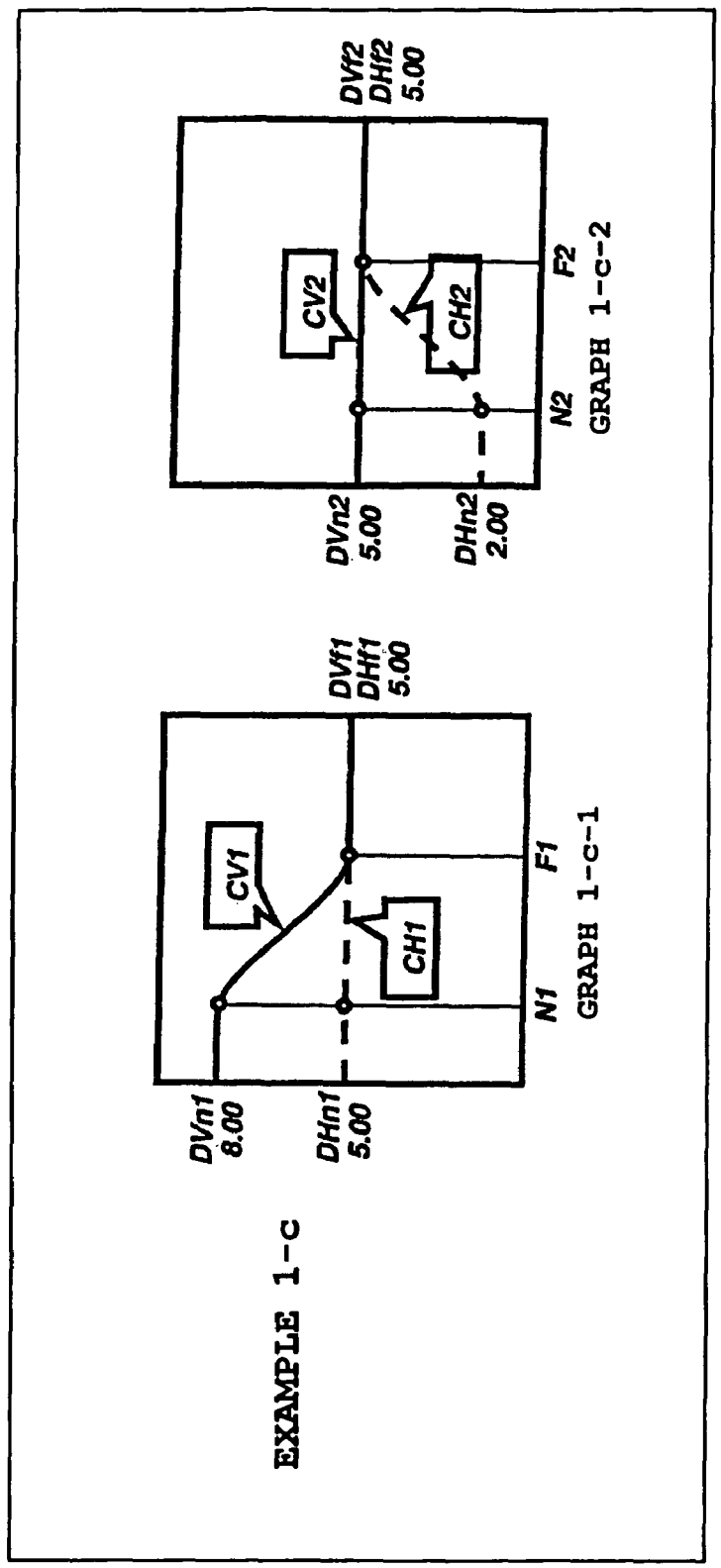
FIG. 7 is a diagram that shows Graphs 1-c-1 and 1-c-2, which show distributions of surface refractive power of an Example 1c.
Figure 8:
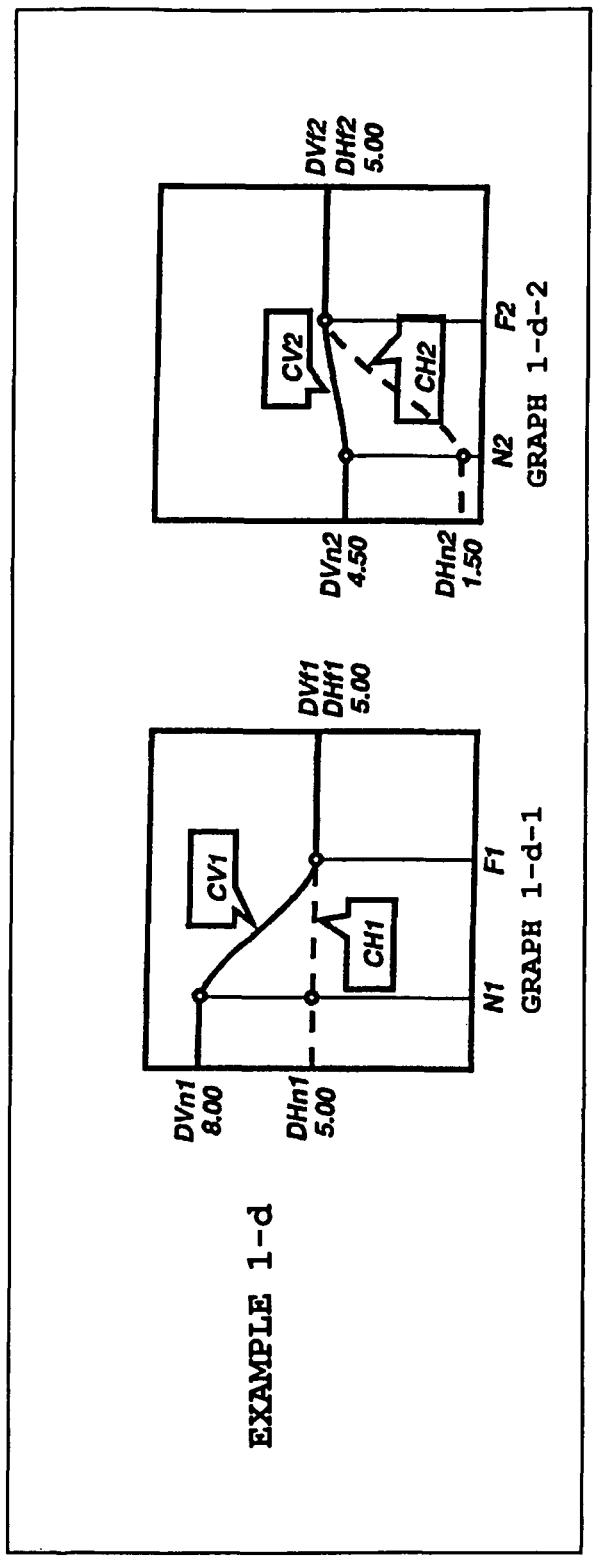
FIG. 8 is a diagram that shows Graphs 1-d-1 and 1-d-2, which show distributions of surface refractive power of an Example 1-d.
Figure 9:
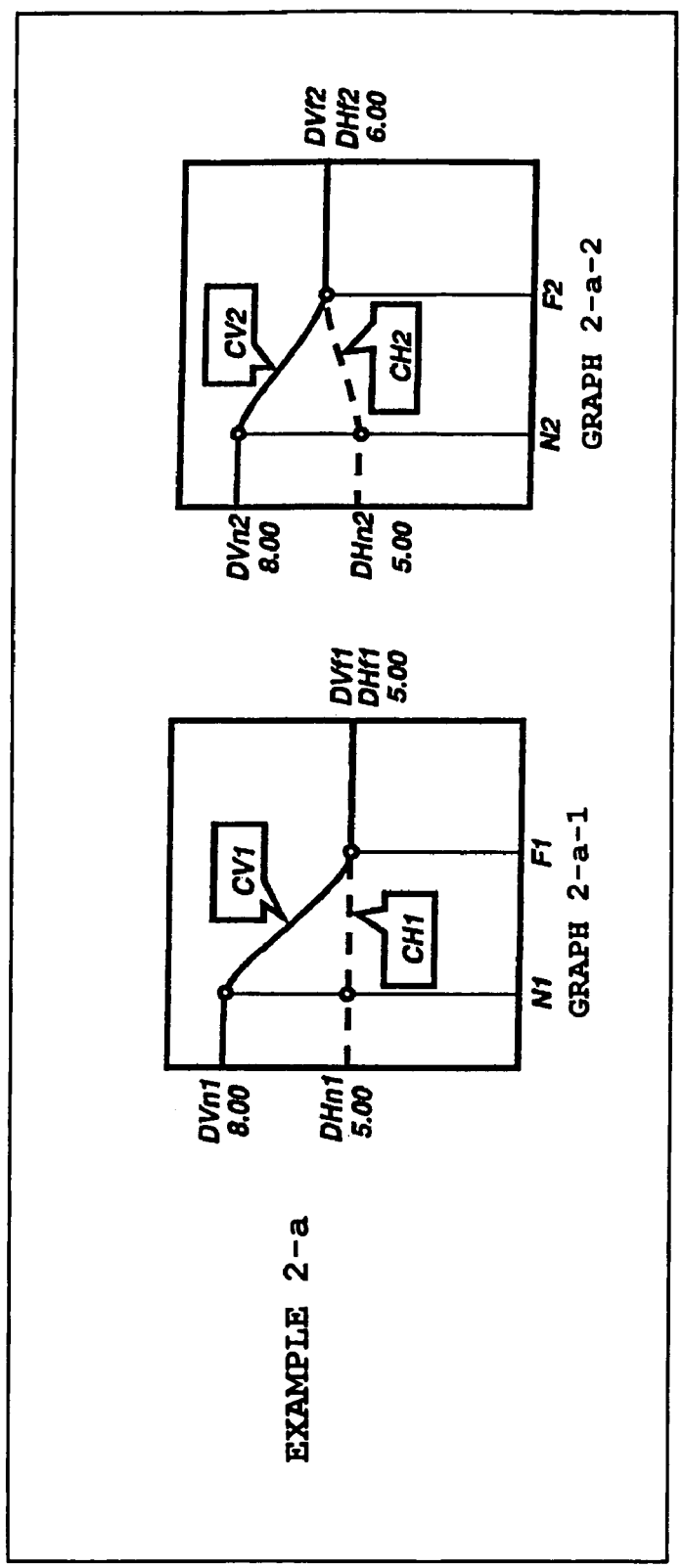
FIG. 9 is a diagram that shows Graphs 2-a-1 and 2-a-2, which show distributions of surface refractive power of an Example 2-a.
Figure 10:
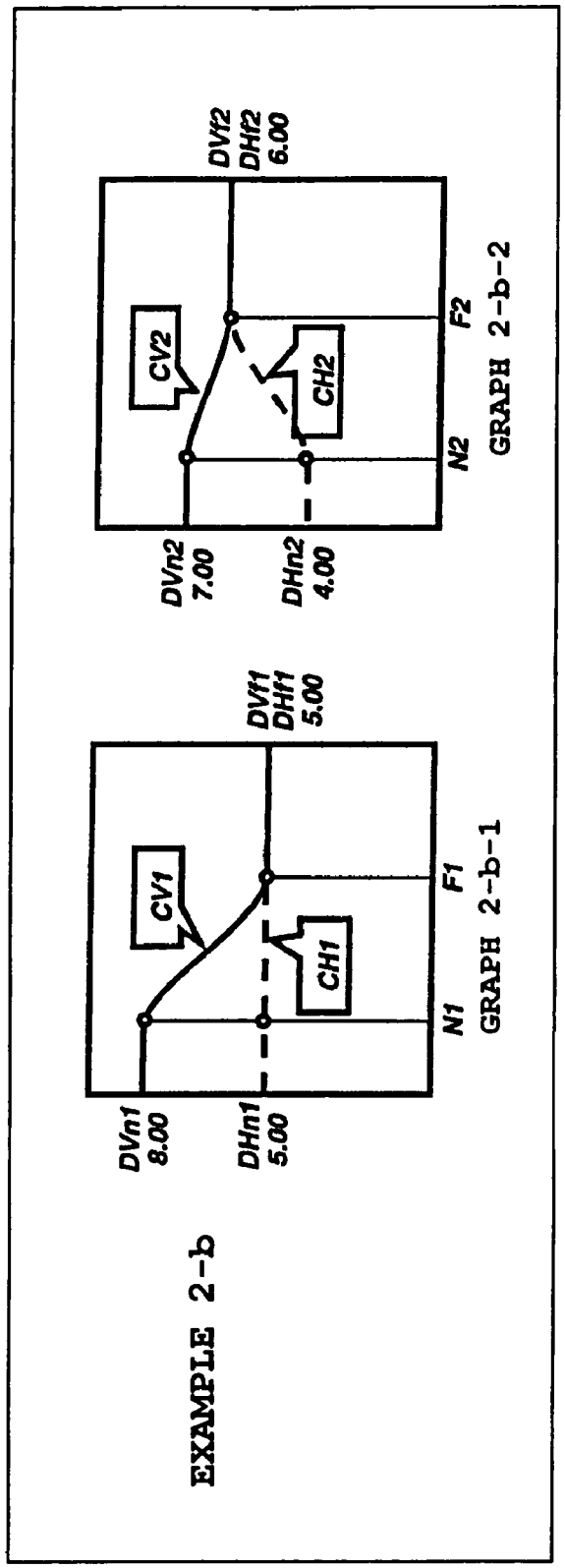
FIG. 10 is a diagram that shows Graphs 2-b-1 and 2-b-2, which show distributions of surface refractive power of an Example 2-b.
Figure 11:
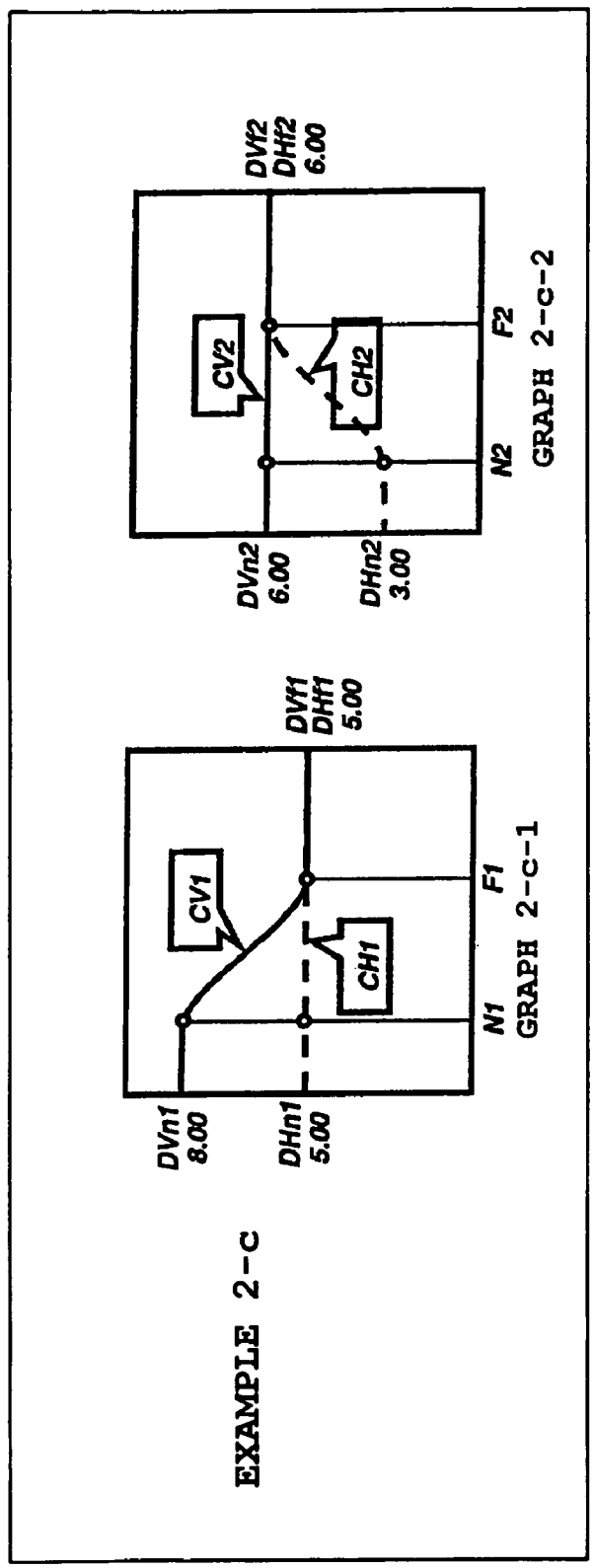
FIG. 11 is a diagram that shows Graphs 2-c-1 and 2-c-2, which show distributions of surface refractive power of an Example 2-c.
Figure 12:
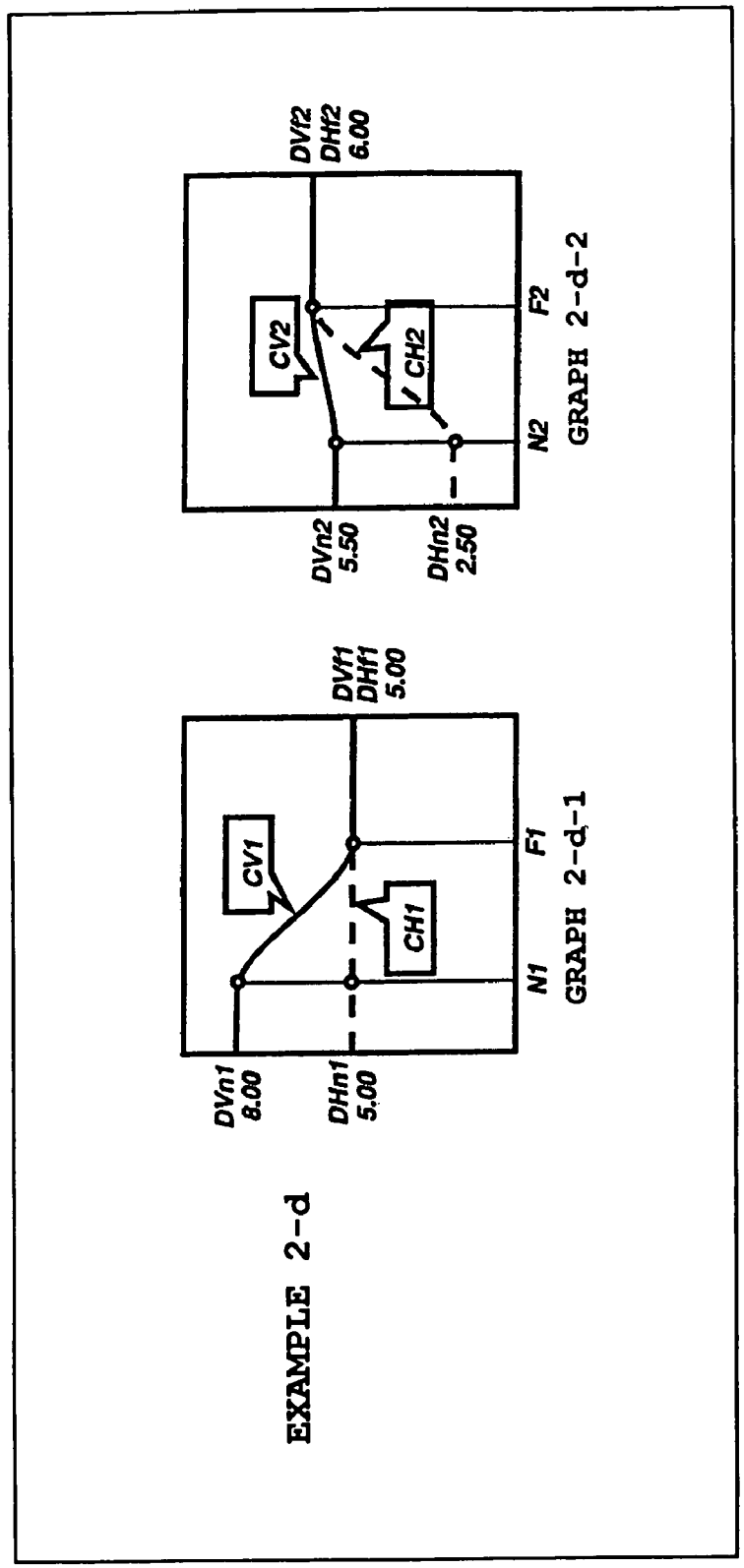
FIG. 12 is a diagram that shows Graphs 2-d-1 and 2-d-2, which show distributions of surface refractive power of an Example 2-d.
Figure 13:
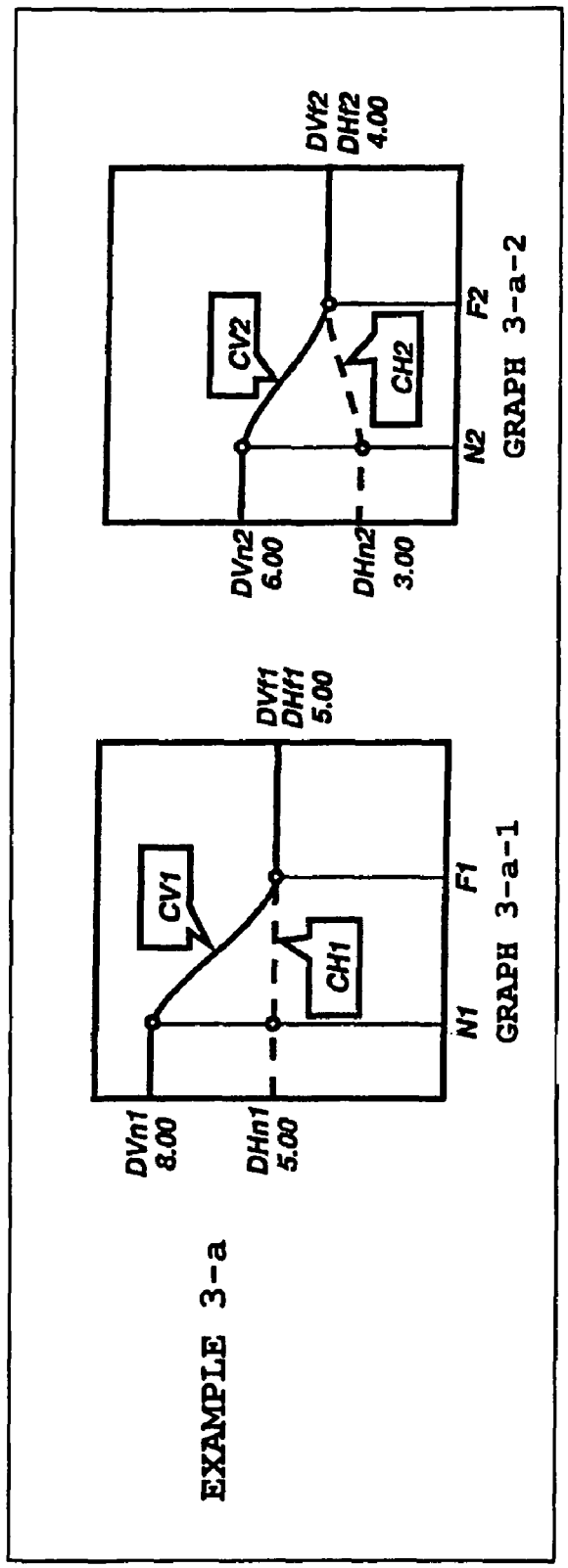
FIG. 13 is a diagram that shows Graphs 3-a-1 and 3-a-2, which show distributions of surface refractive power of an Example 3-a.
Figure 14:
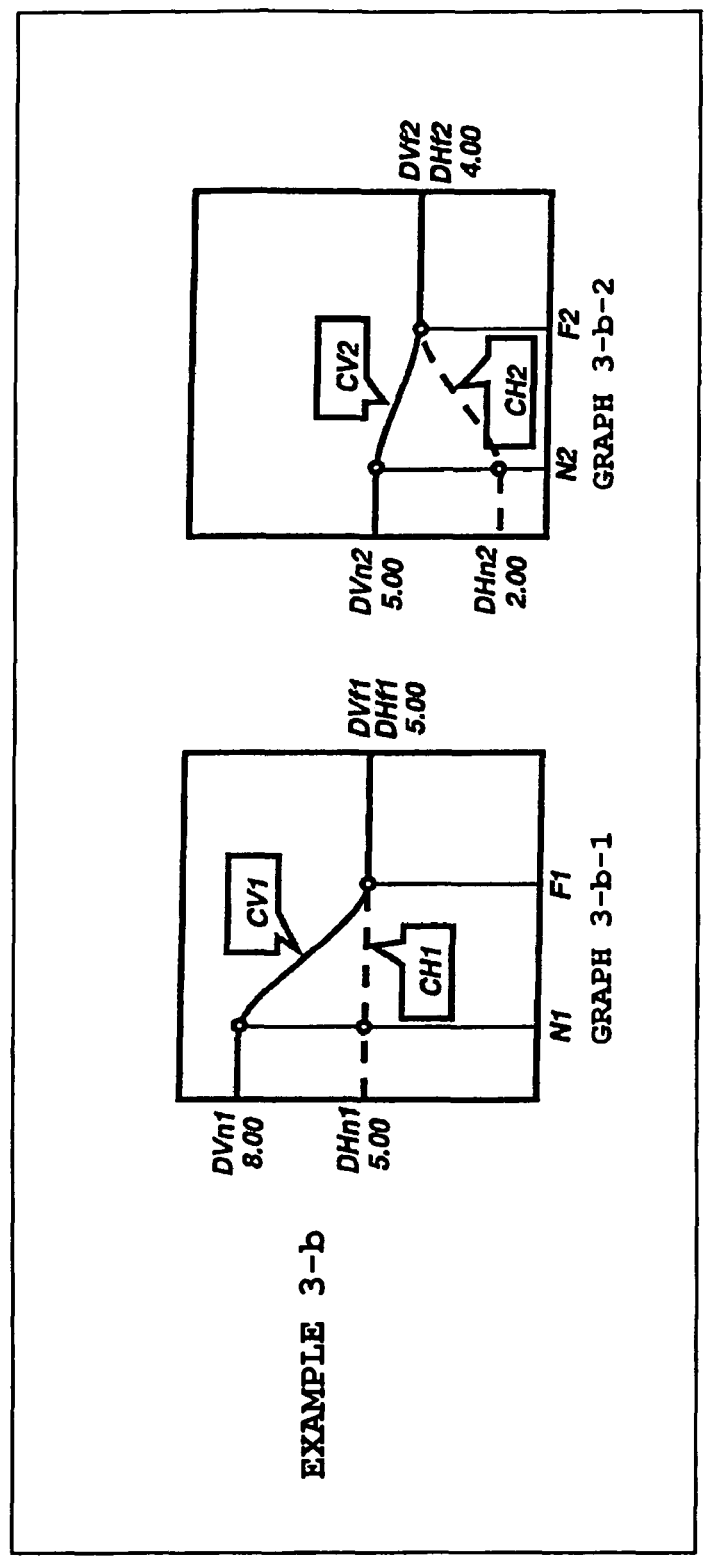
FIG. 14 is a diagram that shows Graphs 3-b-1 and 3-b-2, which show distributions of surface refractive power of an Example 3-b.
Figure 15:
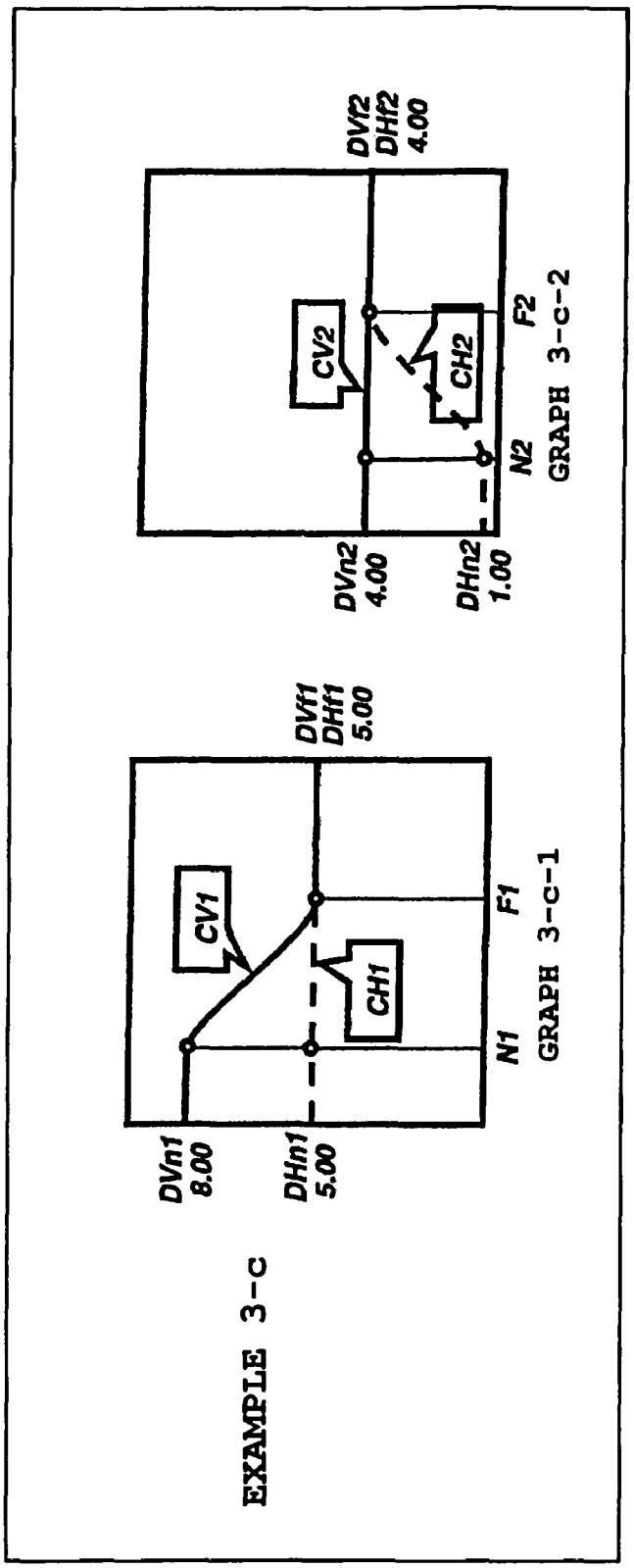
FIG. 15 is a diagram that shows Graphs 3-c-1 and 3-c-2, which show distributions of surface refractive power of an Example 3-c.
Figure 16:
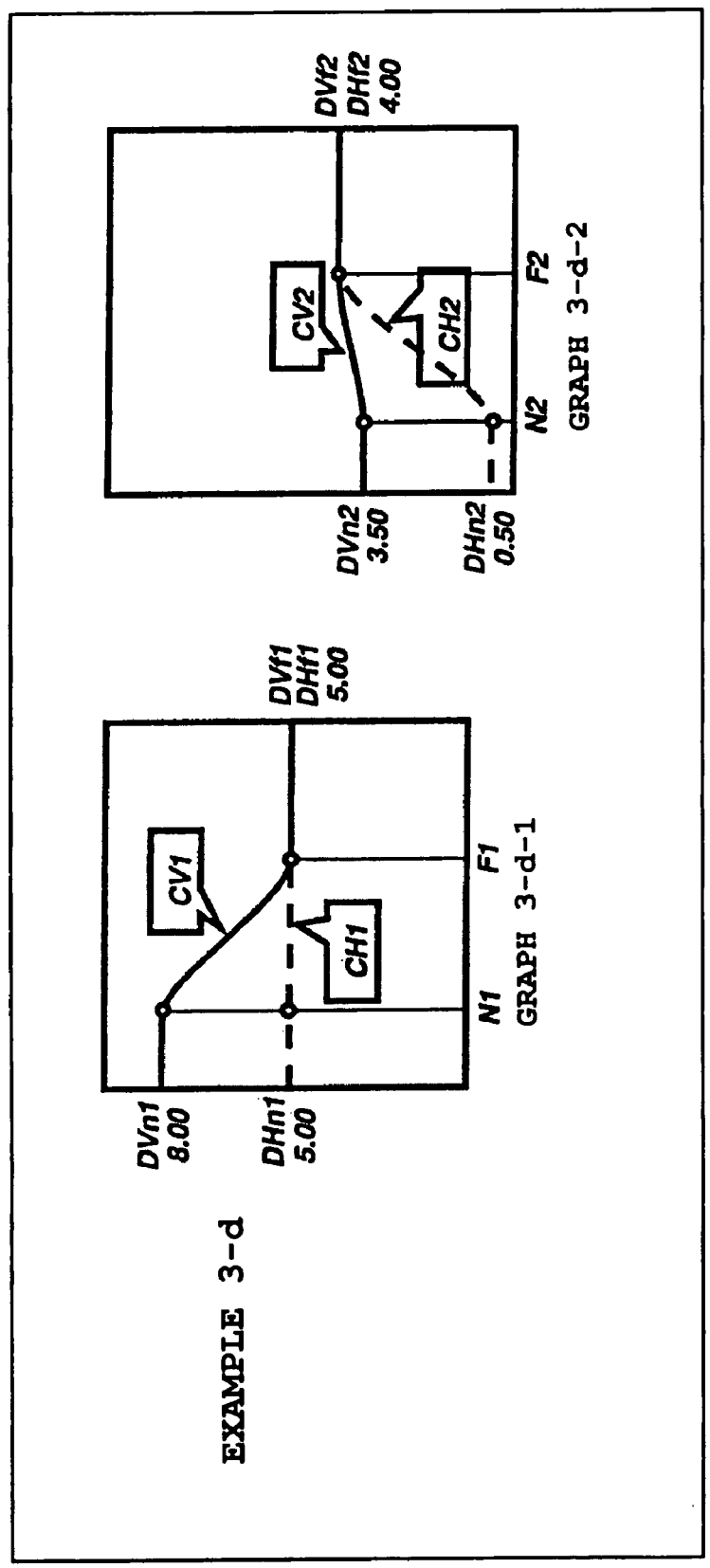
FIG. 16 is a diagram that shows Graphs 3-d-1 and 3-d-2, which show distributions of surface refractive power of an Example 3-d.
Figure 17:
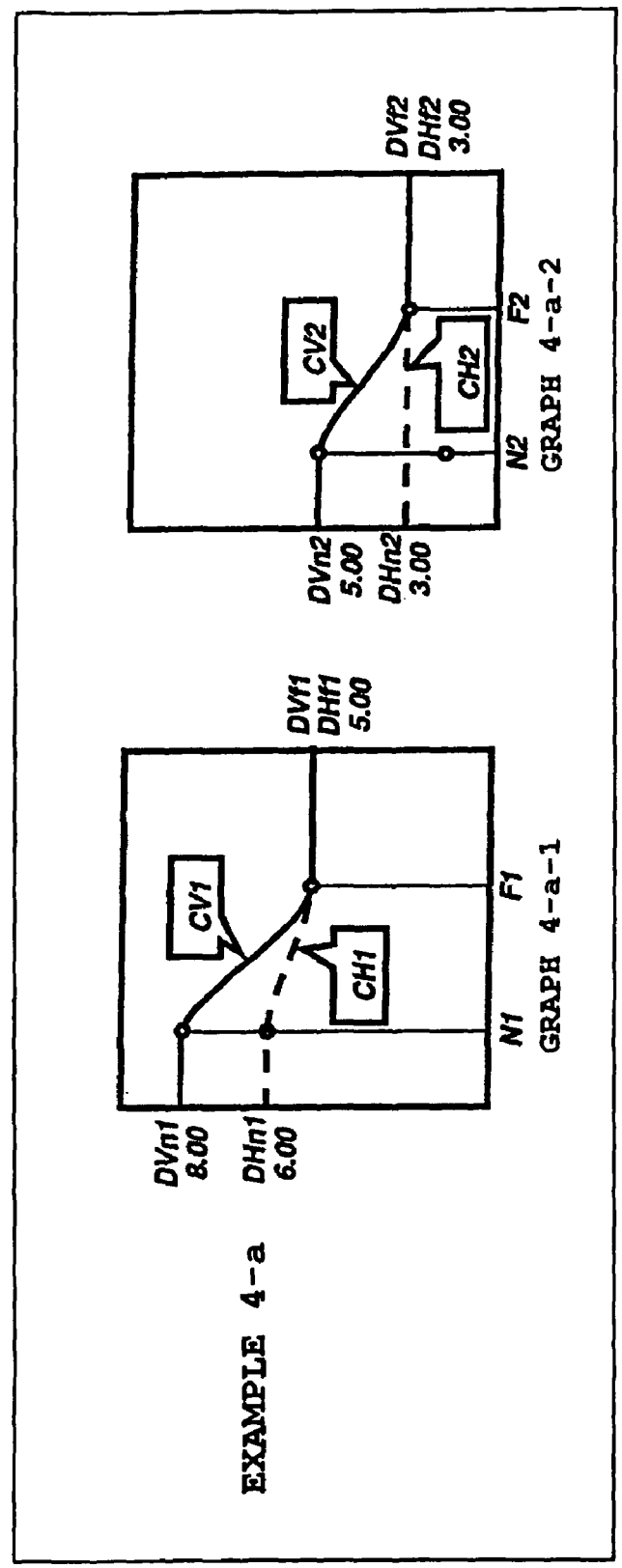
FIG. 17 is a diagram that shows Graphs 4-a-1 and 4-a-2, which show distributions of surface refractive power of an Example 4-a.
Figure 18:
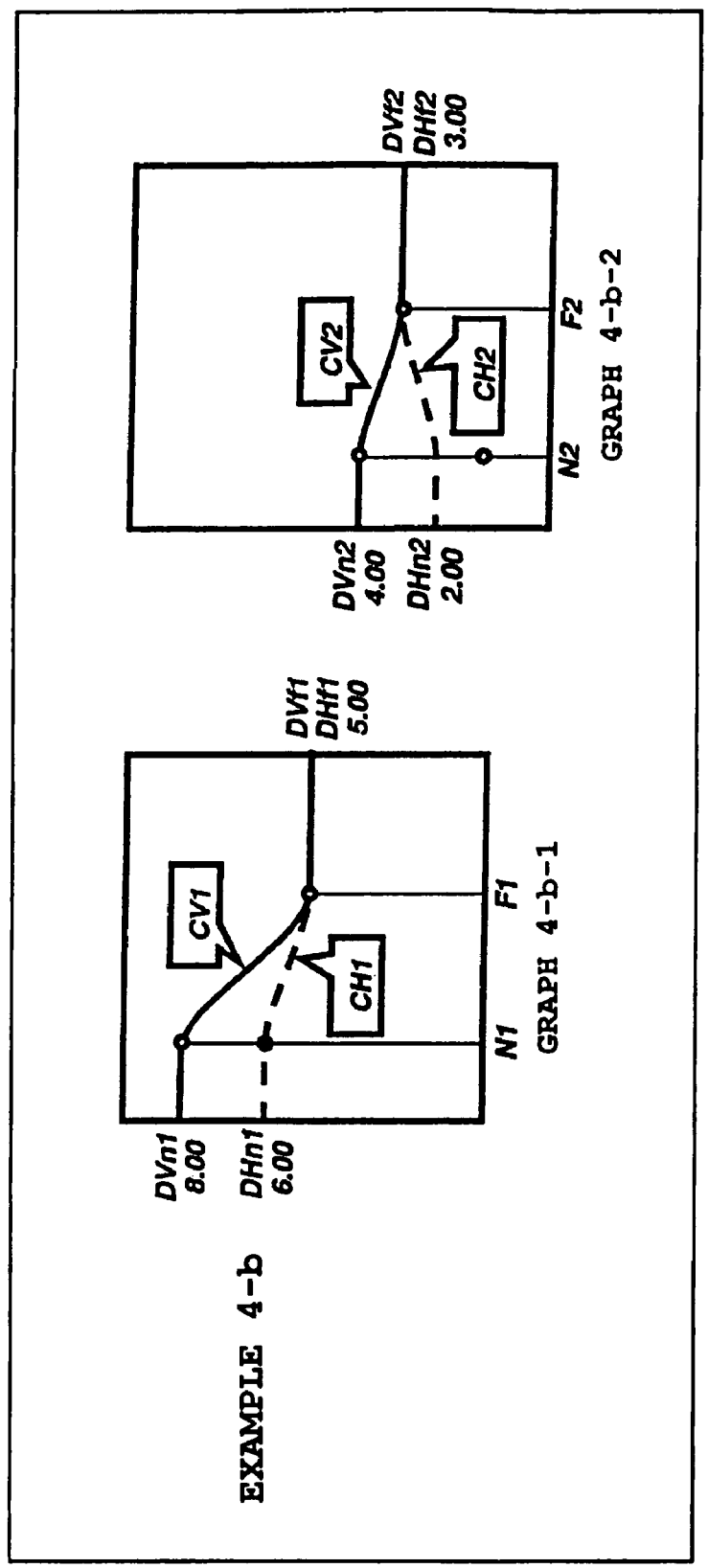
FIG. 18 is a diagram that shows Graphs 4-b-1 and 4-b-2, which show distributions of surface refractive power of an Example 4-b.
Figure 19:
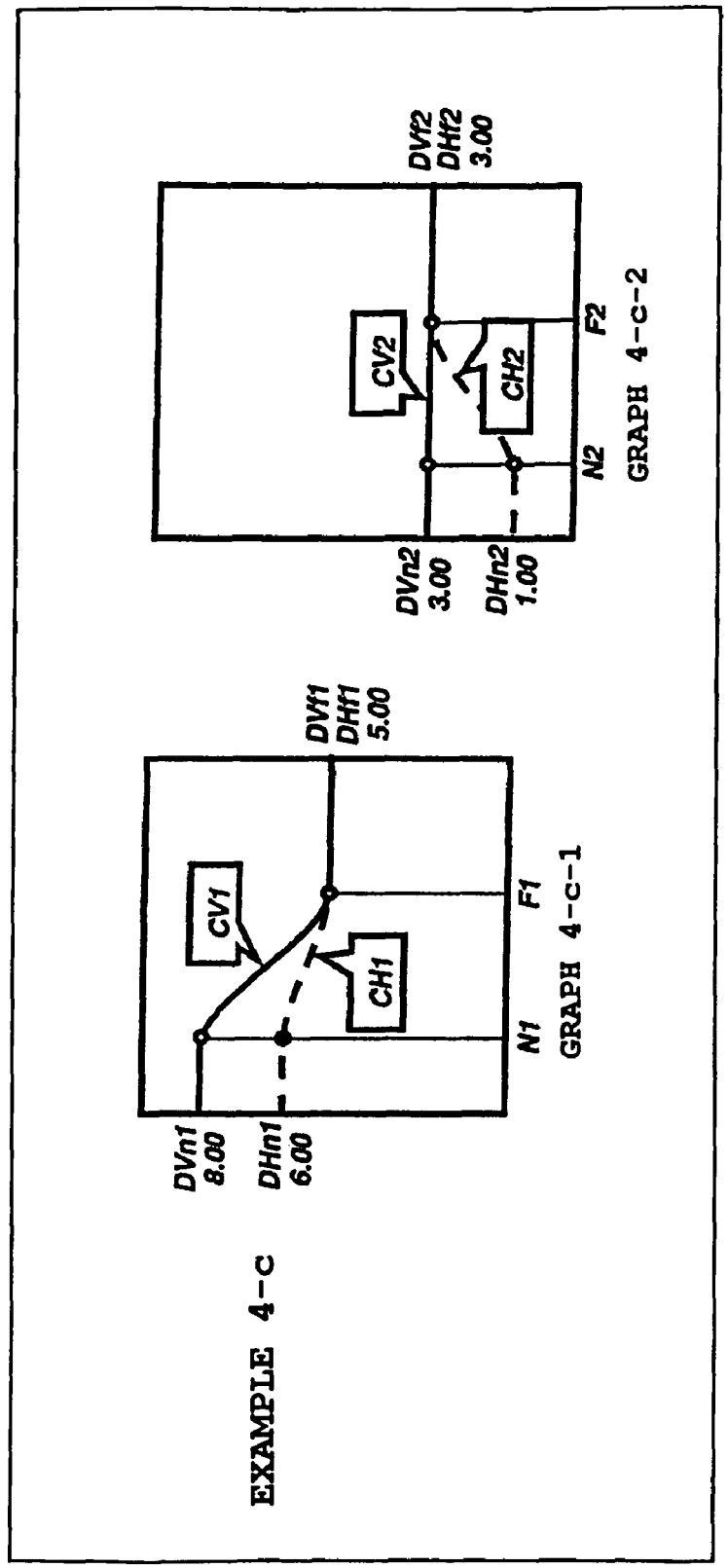
FIG. 19 is a diagram that shows Graphs 4-c-1 and 4-c-2, which show distributions of surface refractive power of an Example 4-c.
Figure 20:
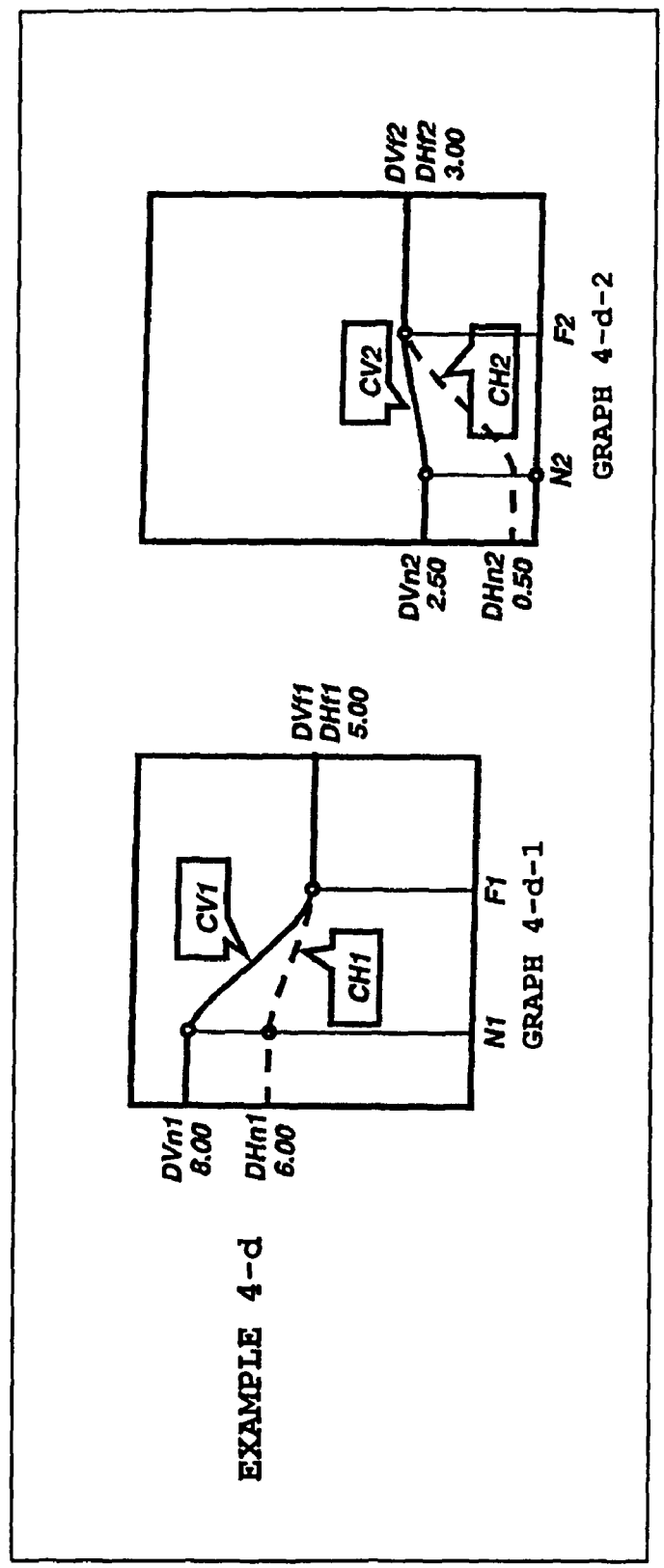
FIG. 20 is a diagram that shows Graphs 4-d-1 and 4-d-2, which show distributions of surface refractive power of an Example 4-d.

The invention claimed is:

1. A method for producing a group of bi-aspherical type progressive-power lenses with each lens having a progressive refractive power action dividedly allotted to a first refractive surface being an object side surface and a second refractive surface being an eyeball side surface, in which lens, when a surface refractive power in a horizontal direction and a surface refractive power in a vertical direction, at a far vision power measurement position F1 on the first refractive surface are DHf and DVf respectively, and a surface refractive power in a horizontal direction and a surface refractive power in a vertical direction, at a near vision power measurement position N1 on the first refractive surface are DHn and DVn respectively, a relational expression expressed by the following expressions is satisfied, $DHf+DHn<DVf+DVn$, and $DHn<DVn$, surface astigmatism components at F1 and N1 on the first refractive surface are cancelled by the second refractive surface, and a combination of the first and second refractive surfaces gives a far vision power (Df) and an addition power (ADD) based on a prescription value, said method comprising:

producing the group of bi-aspherical type progressive-power lenses so that the same first refractive surface is used for at least two or more lenses of different addition powers.

2. The method for producing a group of bi-aspherical type progressive-power lenses according to claim 1, wherein each lens satisfies $DVn-DVf>ADD/2$ and $DHn-DHf<ADD/2$.

3. A group of bi-aspherical type progressive-power lenses, wherein a group of lenses are produced by the method for producing a group of bi-aspherical type progressive-power lenses according to claim 1.

4. A group of bi-aspherical type progressive-power lenses, wherein a group of lenses are produced by the method for producing a group of bi-aspherical type progressive-power lenses according to claim 2.

5. A method for producing a group of bi-aspherical type progressive-power lenses with each lens having a progressive refractive power action dividedly allotted to a first refractive surface being an object side surface and a second refractive surface being an eyeball side surface, in which lens, when a surface refractive power in a horizontal direction and a surface refractive power in a vertical direction, at a far vision power measurement position F1 on the first refractive surface are DHf and DVf respectively, and a surface refractive power in a horizontal direction and a surface refractive power in a vertical direction, at a near vision power measurement position N1 on the first refractive surface are DHn and DVn respectively, a relational expression expressed by the following expressions is satisfied, $DHf+DHn<DVf+DVn$, and $DHn<DVn$, surface astigmatism components at F1 and N1 on the first refractive surface are cancelled by the second refractive surface, and a combination of the first and second refractive surfaces gives a far vision power (Df) and an addition power (ADD) based on a prescription value, said method comprising:

processing the first refractive surface of the group of bi-aspherical type progressive-power lenses, the group of bi-aspherical type progressive-power lenses having the same first refractive surface;

selecting each of the lenses of the group of bi-aspherical type progressive-power lenses based on the prescription value;

processing the second refractive surface of the each of the lenses of the group of bi-aspherical type progressive-power lenses, the group of bi-aspherical type progressive-power lenses having different addition powers.

* * * * *